US010310186B2

(12) United States Patent
Grudinin et al.

(10) Patent No.: US 10,310,186 B2
(45) Date of Patent: Jun. 4, 2019

(54) METHOD OF ENGINEERING THE DISPERSION OF WHISPERING GALLERY MODE RESONATORS AND THE RESONATORS WITH DISPERSION ENGINEERED BY THE METHOD

(71) Applicant: California Institute of Technology, Pasadena, CA (US)

(72) Inventors: Ivan S. Grudinin, Pasadena, CA (US); Nan Yu, Arcadia, CA (US); Lukas M. Baumgartel, Portland, OR (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 18 days.

(21) Appl. No.: 15/069,725

(22) Filed: Mar. 14, 2016

(65) Prior Publication Data
US 2016/0266319 A1    Sep. 15, 2016

Related U.S. Application Data

(60) Provisional application No. 62/302,636, filed on Mar. 2, 2016, provisional application No. 62/175,588, filed on Jun. 15, 2015, provisional application No. 62/132,966, filed on Mar. 13, 2015.

(51) Int. Cl.
*G02B 6/293*     (2006.01)
*G06F 17/50*     (2006.01)
*G02B 27/00*     (2006.01)
*G02B 6/138*     (2006.01)

(52) U.S. Cl.
CPC ..... *G02B 6/29341* (2013.01); *G02B 27/0012* (2013.01); *G06F 17/50* (2013.01); *G02B 6/138* (2013.01)

(58) Field of Classification Search
CPC ............ G02B 6/29341; G02B 27/0012; G02B 6/138; G06F 17/50
See application file for complete search history.

(56) References Cited

U.S. PATENT DOCUMENTS

| 5,652,556 | A  | * | 7/1997  | Flory ........................ H01P 7/06 331/107 DP |
| 6,633,696 | B1 | * | 10/2003 | Vahala ................... B82Y 20/00 385/1 |
| 6,901,189 | B1 | * | 5/2005  | Savchenkov ...... G02B 6/12007 385/24 |
| 7,440,651 | B1 |   | 10/2008 | Savchenkov et al. |
| 7,729,047 | B1 | * | 6/2010  | Savchenkov ............ G02B 5/28 356/480 |

(Continued)

OTHER PUBLICATIONS

Matsko, A.B., "Practical Applications of Microresonators in Optics and Photonics", CRC Press, 2009.
(Continued)

*Primary Examiner* — Thomas A Hollweg
*Assistant Examiner* — Erin D Chiem
(74) *Attorney, Agent, or Firm* — Gates & Cooper LLP

(57) ABSTRACT

A method for fabricating a resonator structure, comprising engineering dispersion of electromagnetic radiation guided along a boundary of an axially symmetric substrate, the engineering comprising micro-structuring a geometry of the boundary, wherein the structure defines a waveguide for electromagnetic radiation.

21 Claims, 19 Drawing Sheets

(56) References Cited

U.S. PATENT DOCUMENTS

| | | | |
|---|---|---|---|
| 7,835,066 B2* | 11/2010 | Livingston | G02F 1/3534 359/332 |
| 2002/0044739 A1* | 4/2002 | Vahala | B23K 26/0823 385/30 |
| 2005/0111776 A1* | 5/2005 | Martin | G02B 6/12007 385/14 |
| 2006/0159392 A1* | 7/2006 | Popovic | G02B 6/12007 385/27 |
| 2006/0285799 A1* | 12/2006 | Spillane | G02B 6/12007 385/50 |
| 2008/0273835 A1* | 11/2008 | Popovic | G02B 6/12007 385/27 |
| 2009/0220228 A1* | 9/2009 | Popovic | G02B 6/12007 398/48 |
| 2011/0019186 A1* | 1/2011 | Himmelhaus | G01N 21/648 356/317 |
| 2012/0274944 A1* | 11/2012 | Maqbool | H01S 3/0627 356/459 |
| 2012/0308181 A1* | 12/2012 | Hafezi | G02B 6/12007 385/31 |
| 2014/0110572 A1* | 4/2014 | Li | G01J 1/0209 250/227.23 |
| 2014/0192363 A1* | 7/2014 | Kippenberg | G01J 3/42 356/451 |

OTHER PUBLICATIONS

Boyd, R.W., Nonlinear Optics, Academic Press, 2008.
Grudinin, I.S., et al., "Frequency comb from a microresonator with engineered spectrum", Optics Express, 2012, pp. 5604-6609, vol. 20, No. 6.
Grudinin, I.S., et al., "Finite-element modeling of coupled optical microdisk resonators for displacement sensing", J. Opt. Soc, Am. B, Nov. 2012, pp. 3010-3014, vol. 29, No. 11.
Oxborrow, M., "Traceable 2-D Finite-Element Simulation of the Whispering-Gallery Modes of Axisymmetric Electromagnetic Resonators", IEEE Transactions on Microwave Theory and Techniques, Jun. 2007, pp. 1209-1218, vol. 55, No. 6.
Grudinin, I.S., et al., "Micro-structured crystalline resonators for optical frequency comb generation", as downloaded on Mar. 14, 2016, from website entitled http://arxiv.org/abs/1406.2682.
FreeFem+−cs website entitled "http://www.ann.jussieu.fr/~lehyaric/ffcs/" as downloaded on Mar. 14, 2016, containing source code used to compute eigenvalues.
COMSOL, Matlab, and Mathematica sources code Website entitled "https://sites.google.com/site/axisymmetricmarkoxborrow/" as downloaded on Mar. 14, 2016.
Grudinin, I.S., et al., "Dispersion engineering of crystalline resonators via microstructuring", Optics, Mar. 2015, pp. 221-224, vol. 2, No. 3.
Matsko, A.B., et al., "Optical Resonators With Whispering-Gallery Modes—Part I: Basics", IEEE Journal of Selected Topics in Quantum Electronics, Jan./Feb. 2006, pp. 3-14, vol. 12, No. 1.
Savchenkov, A.A., et al. "Optical resonators with ten million finesse", Optics Express, May 28, 2007, pp. 6768-6773, vol. 15, No. 11.
Hossein-Zadeh, M., et al., "Ring resonator-based photonic microwave receiver modulator with picowall sensitivity", IET Optoelectron, 2011, pp. 36-39, vol. 5, No. 1.
Grudinin, I.S., et al., "Brillouin Lasing with a CaF2 Whispering Gallery Mode Resonator", Physical Review Letters, Jan. 30, 2009, pp. 043902-1-043902-4, vol. 102.
Furst, J.U., et al., "Quantum Light from a Whispering-Gallery-Mode Disk Resonator", Physical Review Letters, Mar. 18, 2011, pp. 113901-1-113901-4, vol. 106.
Herr, T., et al., "Temporal solitons in optical microresonators", Nature Photonics, Feb. 2014, pp. 145-152, vol. 8.
Hofer, J., et al., "Cavity optomechanics with ultrahigh-Q crystalline microresonators", Physical Review A, 2010, pp. 031804-1-031804-4, vol. 82.
Fortsch, M., et al., "A versatile source of single photons for quantum information processing", Nature Communications, 2013, pp. 1-5, vol. 4, No. 1818.
Strekalov, D.V., et al., "Optical sum-frequency generation in a whispering-gallery-mode resonator", New Journal of Physics, 2014, pp. 1-15, vol. 16.
Moss, D.J., et al., "New CMOS-compatible platforms based on silicon nitride and Hydex for nonlinear optics", Nature Photonics, Aug. 2013, pp. 597-607, vol. 7.
Del'Haye, P., et al., "Octave Spanning Tunable Frequency Comb from a Microresonator", Physical Review Letters, Aug. 5, 2011, pp. 063901-1-063901-4, vol. 107.
Li, J. et al., "Electro-optical frequency division and stable microwave synthesis", Science, Jul. 18, 2014, pp. 309-313, vol. 345, No. 6194.
Riemensberger, J., et al., "Dispersion engineering of thick high-Q silicon nitride ring-resonators via atomic layer deposition", Optics Express, Dec. 3, 2012, pp. 27661-27669, vol. 20, No. 25.
Ilchenko, V.S., et al., "Dispersion compensation in whispering-gallery modes", J. Opt. Soc. Am. A., Jan. 2003, pp. 157-162, vol. 20, No. 1.
Savchenkov, A.A., et al., "Kerr combs with selectable central frequency", Nature Photonics, May 2011, pp. 293-296, vol. 5.
Matsko, A.B., et al., "Active mode locking with whispering-gallery modes", J. Opt. Soc. Am. B, Nov. 2003, pp. 2292-2296, vol. 20, No. 11.
Cordeiro, C.M.B., et al., "Engineering the dispersion of tapered fibers for supercontinuum generation with a 1064 nm pump laser", Optics Letters, Aug. 1, 2005, pp. 1980-1982, vol. 30, No. 15.
Hausmann, B.J.M., et al., "Diamond nonlinear photonics", Nature Photonics, May 2014, pp. 369-374, vol. 8.
Grudinin, I.S., et al., "Impact of cavity spectrum on span in microresonator frequency combs", Optics Express, Nov. 4, 2013, pp. 26929-26935, vol. 21, No. 22.
Herr, T., et al., "Mode Spectrum and Temporal Soliton Formation in Optical Microresonators", Physical Review Letters, Sep. 19, 2014, pp. 123901-1-123901-6, vol. 113.
Liu, Y., et al., "Investigation of mode coupling in normal-dispersion silicon nitride microresonators for Kerr frequency comb generation", Optica, Sep. 2014, vol. 1, No. 3.
Huang, S.W., et al., "Mode-locked ultrashort pulse generation from on-chip normal dispersion microresonators", Phys. Rev. Lett., Feb. 2015, pp. 1-15 (Supplemental Material pp. S-1-S-21), vol. 114.
Godey, C., et al., "Stability Analysis of the Lugiato-Lefever Model for Kerr Optical Frequency Combs. Part I: Case of Normal Dispersion", Phys. Rev. A, 2014, pp. 1-11, vol. 89, 063814.
Savchenkov, A.A., et al., "Morphology-dependent photonic circuit elements", Optics Letters, May 1, 2006, pp. 1313-1315, vol. 31, No. 9.
Ferdous, F., et al., "Microcavity morphology optimization", Physical Review A, 2014, pp. 033826-1-033826-10, vol. 90.
Kippenberg, T.J., et al., "Microresonator-Based Optical Frequency Combs", Science, Apr. 29, 2011, pp. 555-559, vol. 332.
Savchenkov, A.A., et al., "Stabilization of a Kerr frequency comb oscillator", Optics Letters, Aug. 1, 2013, pp. 2636-2639, vol. 38, No. 15.
Papp, S.B., et al., "Microresonator frequency comb optical clock", Optica, Jul. 2014, pp. 10-14, vol. 1, No. 1.
Pfeifle, J., et al., "Coherent terabit communications with microresonator Kerr frequency combs", Nature Photonics, May 2014, pp. 375-380, vol. 8.
Coen, S., et al., "Universal scaling laws of Kerr frequency combs", Optics Letters, Jun. 1, 2013, pp. 1790-1792, vol. 38, No. 11.
Lamont, M.R.E., et al., "Route to stabilized ultrabroadband microresonator-based frequency combs", Optics Letters, Sep. 15, 2013, pp. 3478-3481, vol. 38, No. 18.
Webb, J.P., "The Finite-Element Method for Finding Modes of Dielectric-Loaded Cavities", IEEE Transactions on Microwave Theory and Techniques, Jul. 1985, pp. 635-639, vol. MTT-33, No. 7.
Hecht, F., "New development in freefem++", J. Numer. Math., 2012, pp. 251-265, vol. 20, No. 3-4.

(56) References Cited

OTHER PUBLICATIONS

Lee, Hansuek, et al., "Chemically etched ultrahigh-Q wedge-resonator on a silicon chip", Nature Photonics 6, pp. 369-373, 2012.

* cited by examiner

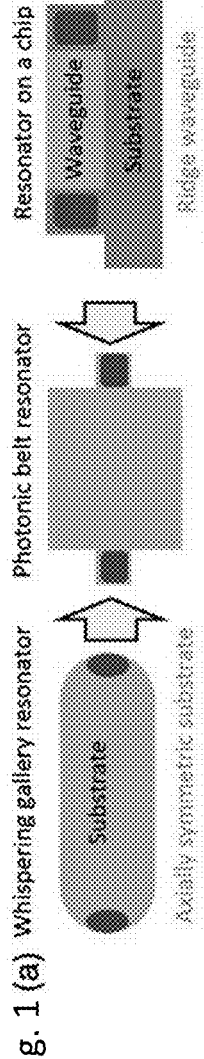
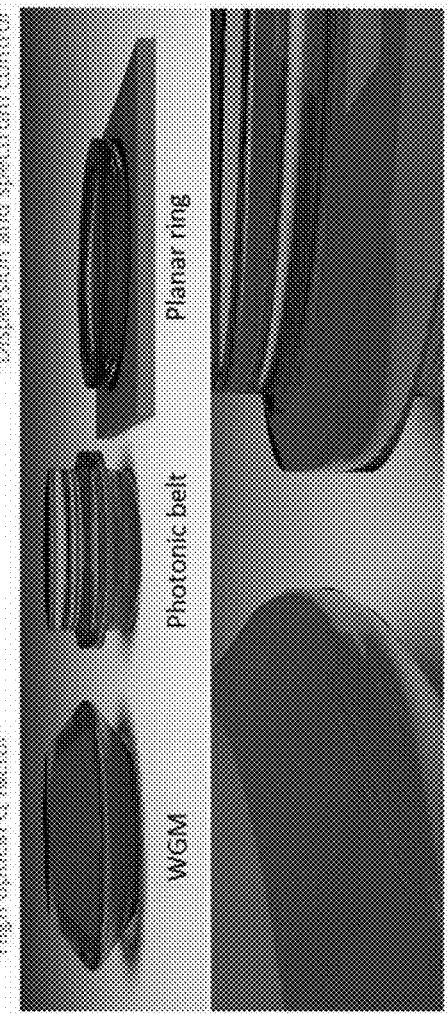
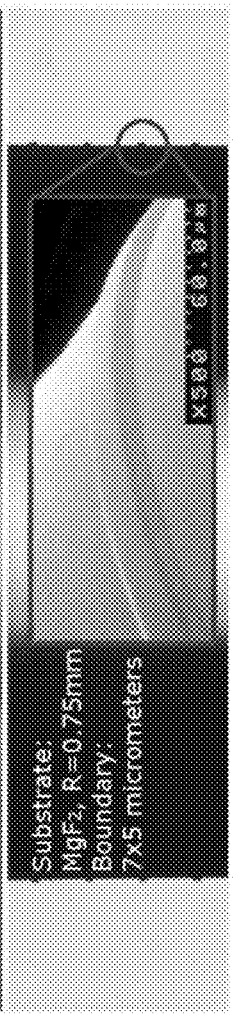
Fig. 1(a) Fig. 1(b) Fig. 1(c) Fig. 1(d)

US 10,310,186 B2

METHOD OF ENGINEERING THE DISPERSION OF WHISPERING GALLERY MODE RESONATORS AND THE RESONATORS WITH DISPERSION ENGINEERED BY THE METHOD

CROSS REFERENCE TO RELATED APPLICATIONS

This application claims the benefit under 35 U.S.C. Section 119(e) of the following co-pending and commonly-assigned U.S. applications:

U.S. Provisional Patent Application Ser. No. 62/132,966, filed on Mar. 13, 2015, by Ivan S. Grudinin, Nan Yu, and Lukas M. Baumgartel, entitled "METHOD OF ENGINEERING THE DISPERSION OF WHISPERING GALLERY MODE RESONATORS AND THE RESONATORS WITH DISPERSION ENGINEERED BY THE METHOD,";

U.S. Provisional Patent Application Ser. No. 62/175,588, filed on Jun. 15, 2015, by Ivan S. Grudinin and Nan Yu, entitled "MICROSTRUCTURED RESONATORS, A FABRICATION AND IMAGING METHOD,"; and U.S. Provisional Patent Application Ser. No. 62/302,636, filed on Mar. 2, 2016, by Ivan S. Grudinin and Nan Yu, entitled "DISPERSION ENGINEERING OF CRYSTALLINE RESONATORS VIA MICROSTRUCTURING,";

all of which application is incorporated by reference herein.

STATEMENT REGARDING FEDERALLY SPONSORED RESEARCH AND DEVELOPMENT

The invention described herein was made in the performance of work under a NASA contract NNN12AA01C, and is subject to the provisions of Public Law 96-517 (35 USC 202) in which the Contractor has elected to retain title.

BACKGROUND OF THE INVENTION

1. Field of the Invention

This invention relates to dispersion engineering of resonators.

2. Description of the Related Art (Note: This application references a number of different publications as indicated throughout the specification by one or more reference numbers within brackets, e.g., [x]. A list of these different publications ordered according to these reference numbers can be found below in the section entitled "References." Each of these publications is incorporated by reference herein.)

Next generation optical clocks, frequency synthesizers, and other nonlinear optical devices under development around the world and at the Jet Propulsion Laboratory (JPL) will be based on optical frequency combs derived from compact optical resonators with engineered dispersion (e.g. whispering gallery mode resonators). This microcomb technology is currently under development at JPL among other places. For the microcomb to become useful, however, one needs to achieve a large frequency span, preferably close to an octave, along with the soliton formation phenomenon and the repetition rate in the measurable range approximately below 50 GHz. One or more embodiments of the present invention satisfy this need.

SUMMARY OF THE INVENTION

A novelty of one or more embodiments of the present invention is in the capability of dispersion engineering by structuring (e.g., micro-structuring) the cavity shape (of, e.g., WGM resonators). The characteristic and distinct feature of these new cavities is the presence of a structure (e.g., micro-structure) that defines an optical waveguide and a substrate that shares the same axial symmetry with the waveguide. The energy of the optical mode is present both in the waveguide and the substrate and in the medium outside.

Thus, one or more embodiments of the invention disclose a resonator, comprising a structure formed on an axially symmetric or nearly axially symmetric boundary/surface of substrate, the structure (e.g., photonic belt) defining a waveguide for electromagnetic radiation, and the structure having a geometry that engineers dispersion of the electromagnetic radiation.

The dimensions, shape, and/or the geometry of the structure can produce the dispersion that follows a desired wavelength dependence. Within the limits of this method, the dispersion can be any arbitrary function. For example, dimensions, shape, and/or the geometry of the structure can flatten the dispersion, produce the dispersion that is anomalous, support/guide a single mode (or more than one mode) of the electromagnetic radiation (e.g., a WGM mode), obtain a controlled Q-factor for the resonator, and/or generate a comb of frequencies having a frequency span including one octave. The geometry can form the resonator generating a comb of repetition rate below 100 GHz, for example.

The boundary can be on a surface of revolution about an axis of the substrate. For example, the substrate can comprise a cylindrical substrate. The boundary can be on a vertical or angled sidewall of the substrate, for example. In one or more embodiments, the substrate has a diameter of more than 0.005 mm.

The structure can comprise a microstructured ridge or microstructured protrusion on the boundary, e.g., having a height and/or width in a range of 0.1-300 micrometers (for deep ultraviolet (UV) resonators, the height and/or width can be very small, for far infrared (IR) or THz resonators, the height and/or width can be in the hundreds of mkm). The boundary can comprise a photonic belt formed at any position on the boundary, e.g., on a middle, top, and/or bottom of a cylindrical surface. The photonic belt can have any shape, including but not limited to, a rectangular shape, a trapezoidal shape, or a cascaded cross-section.

The substrate can be transparent to the electromagnetic radiation (e.g., having a wavelength in a range of 0.1-400 micrometers). In one or more embodiments, the resonator comprises a ridge waveguide that is formed on a cylindrical substrate, and the waveguide and the substrate are made with the same transparent dielectric.

The substrate can be on a chip.

The waveguide can be structured using computer-controlled process according to a pattern that is determined by numerically solving a three dimensional vectorial Maxwell equation. The numerical solving can calculate eigenvalues (resonance frequencies) with a precision achieved using a finite element method having meshes containing up to 0.5 million elements.

In one or more embodiments the solving of a Maxwell equation numerically and using a finite element method to find each of three adjacent eigenfrequencies representing mode frequencies of the resonator structure, can include (a) solving the Maxwell equation to compute one of the eigenfrequencies using the finite element method using a rough mesh, (b) refining the rough mesh by increasing the number of mesh vertices within the rough mesh, to form a refined mesh, (c) solving the Maxwell equation to compute the one of the eigenfrequencies using the finite element method using the refined mesh, (d) repeating steps (a)-(c) using the refined mesh obtained in step (b) as the rough mesh in the next computing step (a), thereby generating a plurality of refined meshes, until the one of the eigenfrequencies converges with sufficient precision, (e) solving the Maxwell equation to compute the remaining two eigenfrequencies using the rough mesh, (f) solving the Maxwell equation to compute the remaining two eigenfrequencies using the refined meshes obtained in steps (b),(d) and using the same number of repeating steps as in step (d), while adjusting the refractive index only such that errors introduced by the meshes are the same for all three eigenfrequencies; and (g) calculating the dispersion from the three eigenfrequencies.

In one or more embodiments, the solving of a Maxwell equation numerically and using a finite element method to find each of three adjacent eigenfrequencies $f_l$, $f_{l+1}$, and $f_{l-1}$ representing mode frequencies of the resonator structure, can include (a) for each eigenfrequency, building a rough finite element mesh using a set of input approximations, (b) solving the Maxwell equation to compute each of the three eigenfrequencies using the rough finite element mesh, (c) refining each of the rough finite element meshes by increasing the number of mesh vertices within the rough finite element meshes, to form a refined mesh for each of the eigenfrequencies, (d) solving the Maxwell equation to compute the eigenfrequencies using the finite element method using the refined meshes, (e) repeating steps (b)-(d) using the refined meshes obtained in step (c) as the finite element rough mesh in the next solving step (a), until the eigenfrequencies converge with sufficient precision; and (f) calculating the dispersion from the three eigenfrequencies using $$D = \frac{cD_2}{2\pi\lambda^2 RF^3} \times 10^6 \left[ \frac{\text{ps}}{\text{nm} \cdot \text{km}} \right]$$

where $F=0.5(f_{l-1}-f_{l-1})$ is free spectral range near the wavelength $\lambda$, $D_2=f_{l+1}-2f_l-f_{l-1}$, $f_l$ is the optical mode frequency corresponding to l field nodes along the light-guiding boundary of the resonator, and l is an integer.

In one or more embodiments, the dispersion is calculated for the geometry having dimensions measured using a method comprising: making a cast of the resonator; filling the cast with a glue having different refractive index from the cast to form a replica; after hardening the glue, cutting and polishing the replica to reproduce the resonator's geometry; using an optical microscope to obtain an image of the resonator's geometry; and measuring the dimensions using the image.

BRIEF DESCRIPTION OF THE DRAWINGS

Referring now to the drawings in which like reference numbers represent corresponding parts throughout:

FIGS. 1(a)-(d) illustrates a photonic belt resonator (PBR) according to one or more embodiments of the invention. FIG. 1(a) schematically compares a crystalline photonic belt resonator (PBR). FIG. 1(b) shows schematic renderings of a WGM resonator, a PBR, and a planar ring structure. FIG. 1(c) is a close-up view of the sharp-edge WGM resonator and a PBR, with an optical mode shown in a darker shade. FIG. 1(d) shows an optical photograph of four batch fabricated MgF·PBRs and an electron microscope image showing a magnified view.

DETAILED DESCRIPTION OF THE INVENTION

Figure 2:
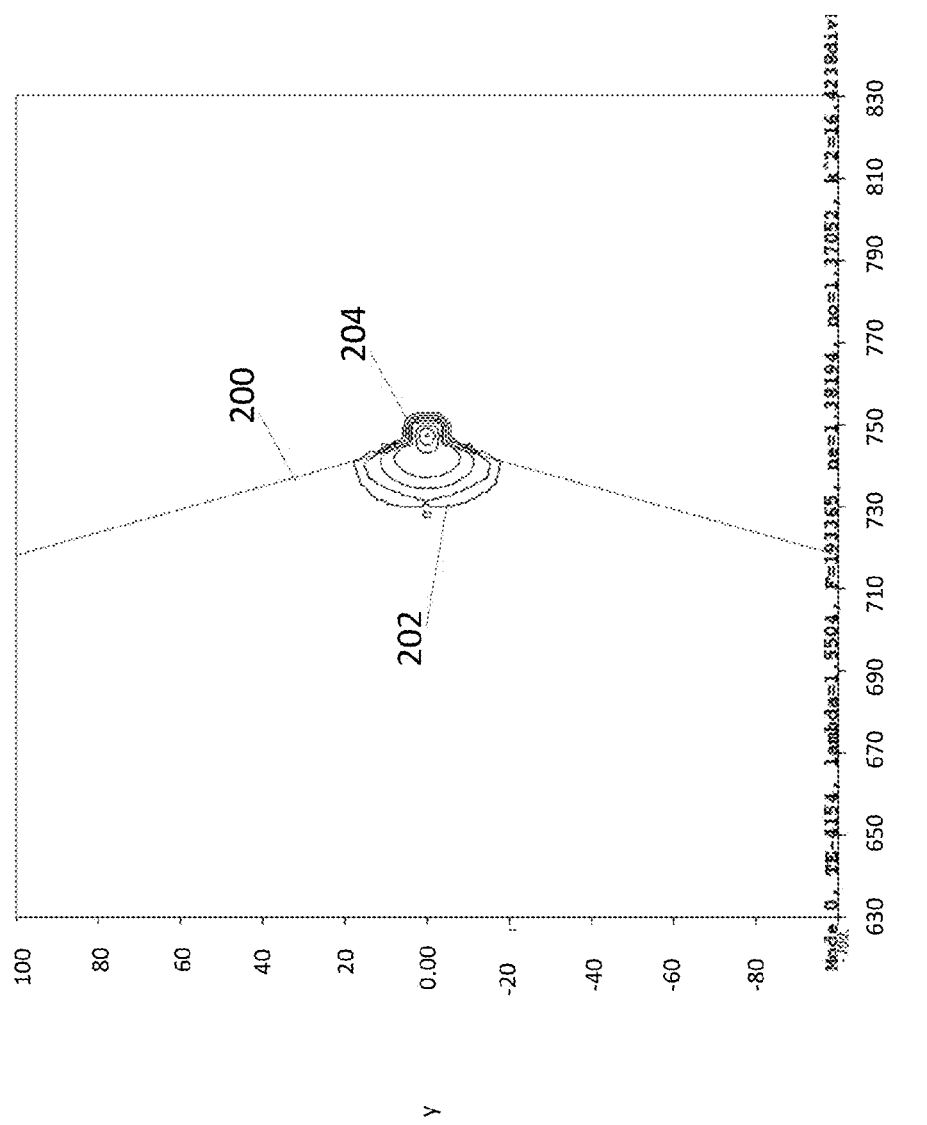
FIG. 2 illustrates a cross-section of a waveguide on an angled sidewall of a substrate, plotting distance in the y and x directions, according to one or more embodiments of the invention.

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Technical Description

The span of a frequency comb and soliton formation are currently understood to be determined, in part, by the cavity spectrum, which can be characterized by the cavity free spectral range (FSR), second order group velocity dispersion (GVD), and dispersion of higher orders describing in general the non-equidistance of mode frequencies. The current state of the art (as evidenced by cutting edge research in a number of laboratories in government, academia, and industry) identifies that resonator modal spectrum not only limits the comb span but also determines whether soliton formation is possible or not in a given cavity. Soliton formation, also known as mode locking, is required for the frequency comb derived from the micro resonator to possess highly desired low noise properties.

Dispersion engineering of WGM resonators, or tailoring the mode spectrum of a resonator, is required to optimize the microcomb performance. Exact frequencies of cavity modes need to be adjusted such that the dispersion coefficients have the desired wavelength dependence and magnitude.

One or more embodiments of the present invention solve the problem of dispersion engineering and solve the WGM resonator dispersion engineering problem for the first time. The problem of WGM cavity dispersion engineering is solved by structuring (e.g., micro-structuring) or designing the shape or geometry of the resonator in the area of optical mode localization.

EXAMPLES

FIG. 1(a) schematically compares a crystalline photonic belt resonator (PBR), according to one or more embodiments of the invention, with a WGM and a ring resonators. As shown in FIG. 1(a), the WGM resonator comprises an axially symmetric substrate with high optical Q factor, the resonator on a chip comprises a waveguide on a substrate, and the PBR combines the axially symmetric substrate of a WGM resonator with the microstructured geometry of an on-chip, planar ring resonator.

FIG. 1(b) shows schematic renderings of a WGM resonator, a PBR, and a planar ring structure.

FIG. 1(c) is a close-up view of the sharp-edge WGM resonator and a PBR, with an optical mode shown in a darker shade.

FIG. 1(d) shows an optical photograph of four batch fabricated $MgF_2$ PBRs and an electron microscope image showing a magnified view. The microstructures are close to the upper, middle, and lower boundary of the substrate.

The monolithic resonant structure according to one or more embodiments combines the axially symmetric substrate with the microstructured light-guiding boundary, a "photonic belt", allowing for geometric dispersion of a specific family of modes to be engineered. In contrast to planar substrate waveguide resonators, the presence of an axially symmetric substrate adds extra flexibility in resonator design because the set of supported mode families and their Q factors can be designed through the amount of coupling of the microstructured boundary with the low Q modes of the cylindrical substrate.

For a target resonator free spectral range (FSR) F=46 GHz around a pump wavelength of $\lambda=1.56$ μm, the radius R of the resonator is approximately given by $R \approx c/(2\pi n_e F) \approx 750$ μm, where $n_e \approx 1.38$ is the extraordinary refractive index of $MgF_2$ and c is the speed of light. In one or more embodiments, the spectrum of the resonator is limited to only one family of TE (electric field along the resonator axis) modes by enforcing the geometric single-mode condition [27]:$1 > 1.565 w^2 h/(750-h) > 1/4$, where h is the height of the protrusion and w is its width in micrometers (see FIG. 8 inset). For h=5 μm, the condition holds if $4.9 < w < 9.7$, giving enough flexibility to change resonator geometry for dispersion design while staying within the single-mode limit. The single-mode condition for w=7 μm holds for the spectral span of one octave: $1.12 < \lambda < 2.23$ μm.

Further Examples: substrates and/or waveguides having different shapes

FIG. 2 illustrates an example where the cylinder (substrate) has non-vertical angled sidewalls 200, and further showing lines 202 of equal optical intensity in the waveguide 204 formed in the sidewalls 200.

The photonic belt is not limited to having a rectangular cross-section. In one or more embodiments, the protrusion/photonic belt can have a trapezoidal shape or in general any shape. Moreover, the photonic belt can have a cascaded cross-section, e.g., comprising a small rectangle on top of a larger rectangle on top of the cylinder substrate. The main idea is that dispersion engineering can be achieved by controlling both the shape/geometry/dimensions of the waveguide and of the substrate in any possible way. In one or more embodiments, the photonic belt can have any profile enabling dispersion control as long as it is comparable in dimensions with the typical/desired mode cross sections for this geometry.

Modelling of the Resonators

Figure 3:
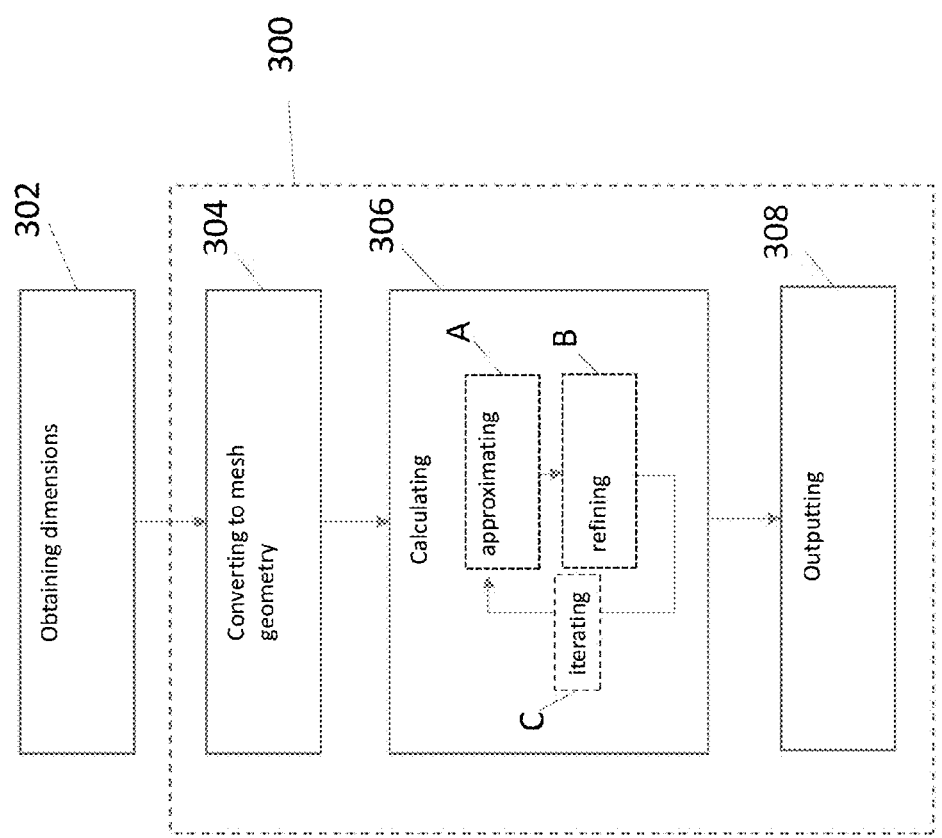
FIG. 3 illustrates a method of simulating dispersion in a micro-structured resonator, according to one or more embodiments of the invention.

FIG. 3 illustrates a method of modelling the resonators using a computer 300 having sufficient processor speed and memory (e.g., a supercomputer, or any computer can be used as long as the computation software package provides the precision that is sufficient for any particular goal).

Figure 4:
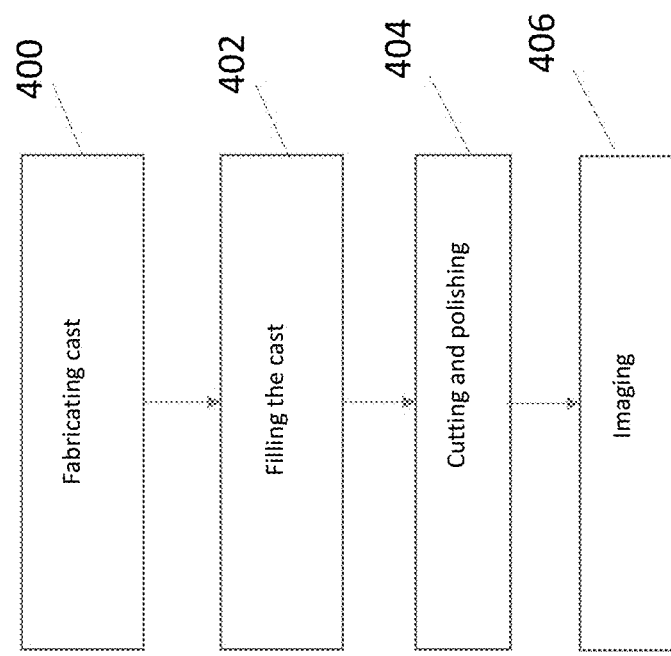
FIG. 4 illustrates a method of imaging a resonator according to one or more embodiments of the invention.
Figure 5:
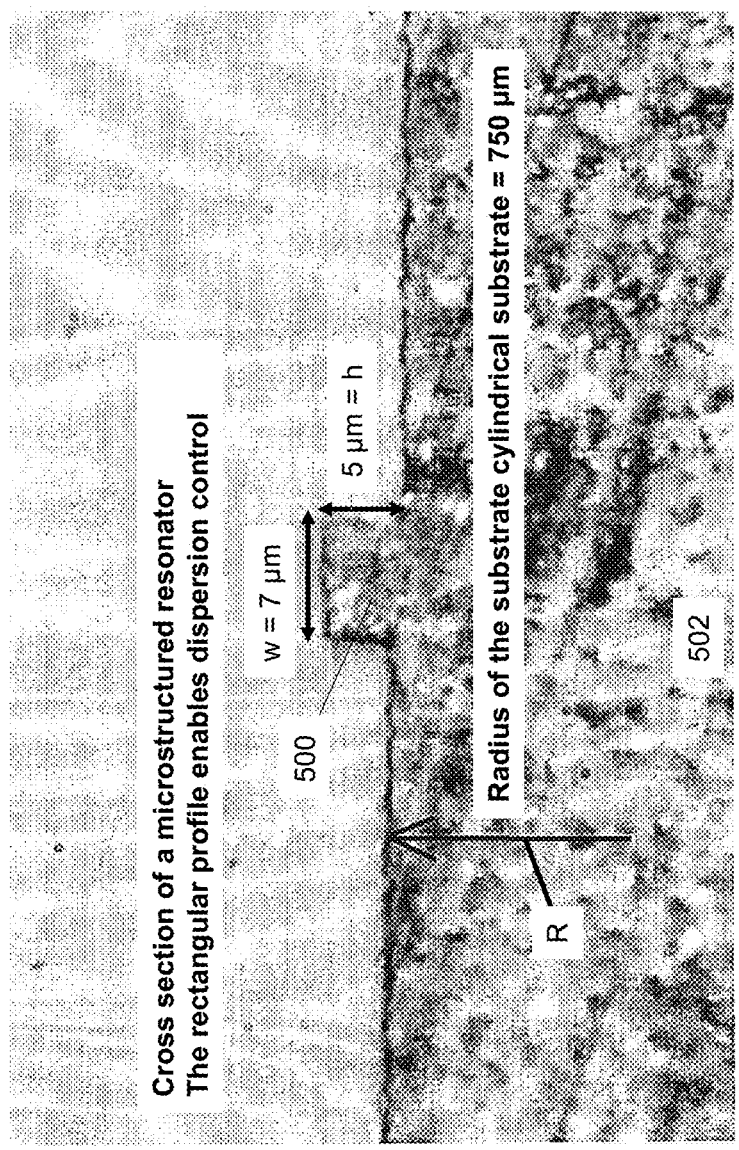
FIG. 5 illustrates a cross-section of a replica of microstructured resonator according to one or more embodiments of the invention.

Block 302 represents obtaining/selecting dimensions/shapes of the boundary. In one or more embodiments, Finite Element Method (FEM) modeling of the fabricated resonators is used and requires knowledge of the resonator cross sections. Such images could not be obtained by optical microscopy or profilometry due to insufficient resolution. Electron microscopy requires a metal coating to counter charging effects, thus making the resonator unusable. In order to overcome these problems, cross sectional images were obtained with sub-wavelength resolution and nondestructively by using a new technique, as illustrated in FIG. 4. FIG. 4 illustrates the technique comprises making a resin cast of a resonator by direct contact and lift-off (Block 400); filling the cast with a glue having different refractive index from the cast material (Block 402); after hardening, cutting the replica and polishing to reproduce the resonator cross section/geometry (Block 404); and using an optical microscope to obtain the image of the resonator boundary/geometry (Block 406). An example of the result of using this technique is shown in FIG. 5, which shows an optical photograph of a cross-section of the replica of the microstructured resonator, showing the microstructured light guiding boundary 500 having a height (h) of 5 µm, a width (w) of 7 µm formed on a cylindrical substrate 502 having a radius (R) of 750 µm, and the rectangular profile of the boundary 500 enabling dispersion control.

Figure 6:
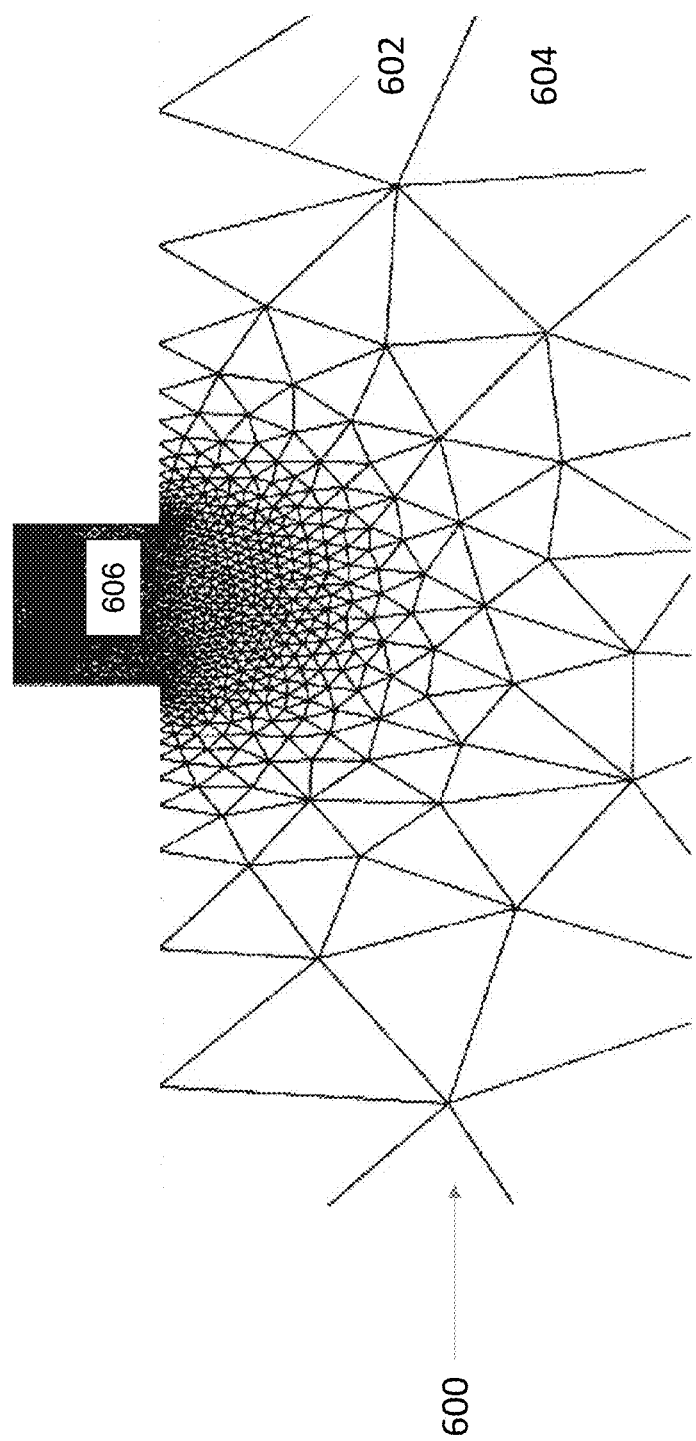
FIG. 6 illustrates a mesh used during FEM modeling of the resonator structure comprising a waveguide and substrate, according to one or more embodiments of the invention.

Block 304 represents converting the images into meshed geometries as can be routinely achieved with help of a FEM software package [35]. FIG. 6 illustrates the mesh 600 used for some of the computations according to one or more embodiments, showing the mesh 600 is a collection of finite elements comprising triangular elements, the boundaries 602 of the triangular elements, the substrate 604, and the waveguide 606.

Block 306 represents calculating the dependence of dispersion on wavelength for the resonator boundary having the selected dimensions. The step comprises solving the three-dimensional vectorial Maxwell wave equation numerically, taking axial symmetry into account [36, 37] to find eigenvalues representing mode frequencies of the resonator. In one or more embodiments, the FreeFem++ package [35,37] implemented on a JPL supercomputer is used. The GVD is related to mode frequencies [18] as follows:

$$D = \frac{cD_2}{2\pi\lambda^2 RF^3} \times 10^6 \left[\frac{\text{ps}}{\text{nm}\cdot\text{km}}\right]$$

where $F=0.5(f_{l-1}-f_{l-1})$ is FSR near $\lambda$, $D_2=f_{l-1}-2f_1-f_{l-1}$, and $f_l$ is the optical mode frequency in GHz corresponding to 1 field nodes along the light-guiding boundary of the resonator.

In order to compute dispersion at one wavelength one needs to compute three adjacent eigenvalues $f_l$, $f_{l+1}$, and $f_{l-1}$ for the desired wavelength and then obtain $D_{2=fl}+1-2f_l-f_l-1$. The absolute precision of an eigenvalue computed with a FEM method depends mostly on the density of used mesh and how well the density of the mesh follows the changes in electromagnetic energy density. When the values of $D_2$ are around 10 kHz for resonator sizes used in one or more embodiments of the invention, the computation of eigenfrequencies $f_l$, $f_{l+1}$, and $f_{l-1}$ with around 1 kHz precision is found to produce GVD of acceptable precision. Typically, the required eigenvalue precision is achieved with meshes containing up to 0.5 million elements.

For each of the three computations (of each eigenfrequency) the mesh needs to be built and then refined step by step as the eigenvalue converges to its true value. Thus, to obtain each eigenfrequency, the method starts with an approximate set of parameters obtained from approximating equations and material specification data and a rough mesh (step A, approximating). For example, in this step, the radius of the resonator, the refractive index values and/or other parameters can be selected. The mesh is then refined and adapted to each intermediate solution using the FEM software built-in mesh adaptation algorithm (step B, refining). The refractive index is recalculated by using its theoretical wavelength dependence at each step as well (e.g., the refractive indices can be updated with the Sellmeier equations at each step and the birefringence can be taken into account). This iterative refining procedure is repeated until the eigenvalue converges with desired precision (step C, iterating).

Figure 7:
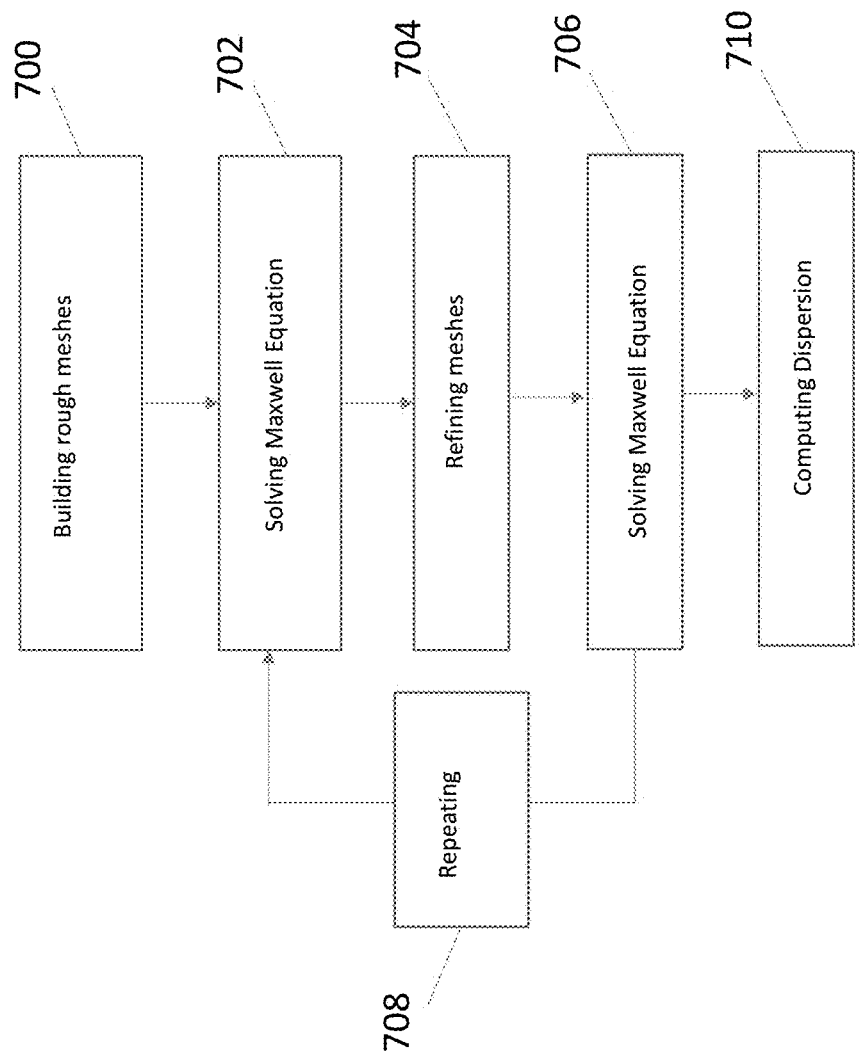
FIG. 7 illustrates a method of calculating eigenfrequencies according to one or more embodiments of the invention.

FIG. 7 illustrates a method solving the three-dimensional vectorial Maxwell wave equation(s) numerically [35-38] and using a finite element method, according to one or more embodiments of Block 306, to find each of three adjacent eigenfrequencies $f_l$, $f_{l+1}$, and $f_{l-1}$ representing mode frequencies of the resonator structure modeled in Blocks 302-304.

Block 700 represents for each eigenfrequency, building a rough finite element mesh using a set of input approximations.

Block 702 represents solving the Maxwell equation(s) [35-38] to compute each of the three eigenfrequencies using the rough finite element mesh.

Block 704 represents refining each of the rough finite element meshes by increasing the number of mesh vertices (resolution) within the rough finite element meshes, to form a refined mesh for each of the eigenfrequencies. For example, the FEM software built-in mesh adaptation algorithm can adapt the mesh to the distribution of electromagnetic field as represented by the eigenvectors (calculated using the Maxwell equations), e.g., the built in mesh adaptation algorithm can increase mesh vertices in areas where electromagnetic field gradient has a higher magnitude and reduce mesh vertices in regions where the electromagnetic field gradient is weaker or where the field has comparatively lower magnitude, as shown in FIG. 6.

Block 706 represents solving the Maxwell equation(s) [35-38] to compute the three refined eigenfrequencies using the finite element method using the refined meshes.

Block 708 represents repeating steps 702-706 using the refined meshes obtained in Block 704 as the finite element rough mesh in the next solving step 702, until the eigenfrequencies converge with sufficient precision. At each step 702, 706, 708, refractive index is recalculated.

As indicated above, the computation error decreases as the number of mesh vertices increase. Thus steps A, B or 702-708 are repeated until (and the meshes are selected such that) the eigenvalue/eigenfrequencies converge with desired precision (e.g., 1 kHz). For example, 0.5 million vertices may be needed at the last step to achieve 1 kHz absolute precision for a mm-sized $MgF_2$ resonator. In one or more embodiments, at least 15 iterations to calculate each eigenfrequency may be required.

Such large meshes require a lot of memory (>32 Gigabytes) which is normally not available in desktop computers as of 2015. In one or more embodiments, to handle such meshes, the solver is implemented on multiple processors of a shared memory parallel computer using message passing interface coding. The FEM solver was verified by comparing its results with the eigenvalues for a spherical resonator [1], for which the exact solutions can be obtained.

However, it is possible to modify the calculation as follows so that the calculation can be implemented on a regular desktop computer (e.g., having less than 32 Gigabits of memory) using the FreeFem++ [35] or COMSOL [39] packages or similar tools. In one or more embodiments, the mesh is refined through several steps to the point where the computation error (defined as the difference in computed eigenvalues for the current and the previous mesh) of $f_1$ is around a MHz. Then, the same sequence of meshes should be used to compute the other two frequencies while adjusting the refractive index only. In this way, the errors introduced by the meshing process are the same for all three eigenvalues and they mostly cancel out during the computation of $D_2$. This technique was found impossible to justify from the existing theory of FEM method. The less processing intensive method was verified experimentally by comparing its results with rigorous computation obtained on a supercomputer.

Figure 8:
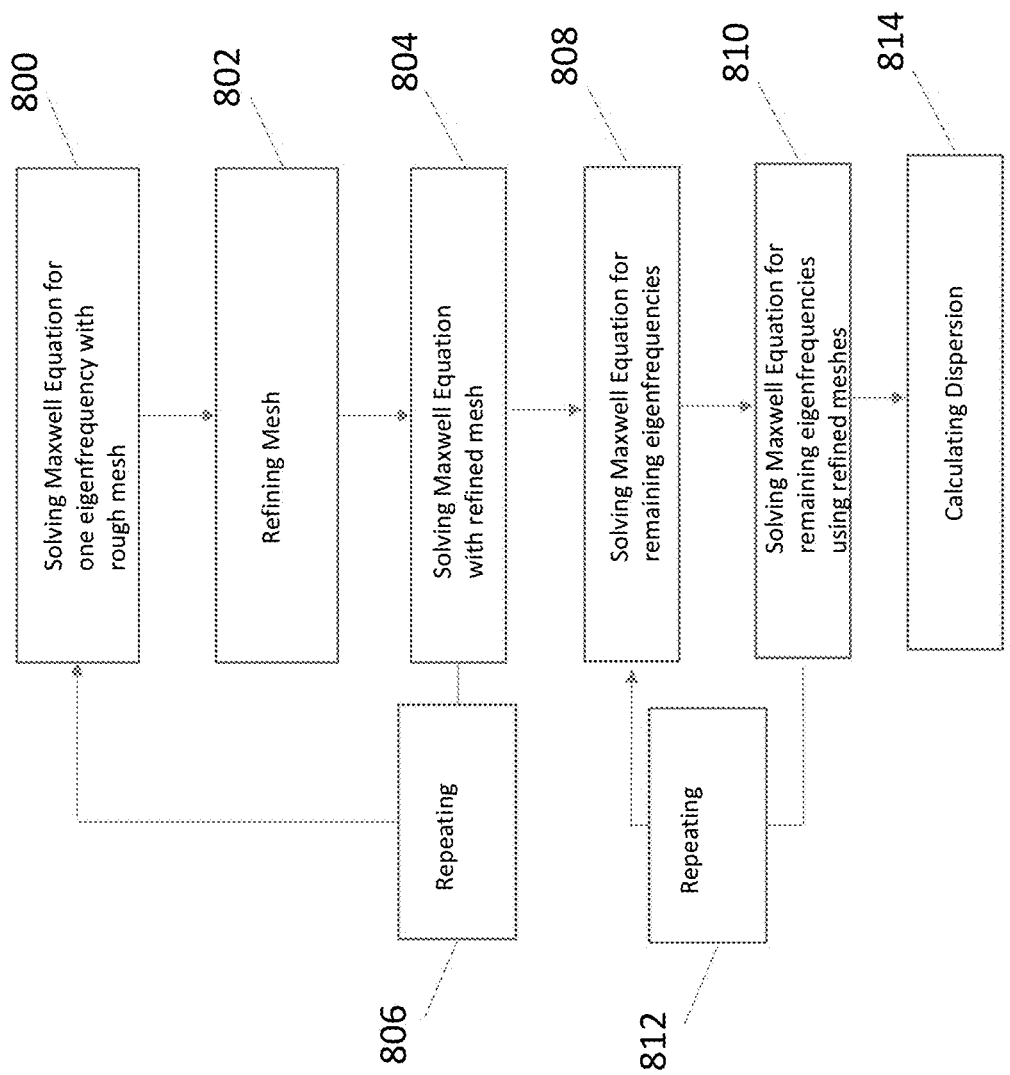
FIG. 8 illustrates a method of calculating eigenfrequencies using a computer having reduced memory, according to one or more embodiments of the invention.

FIG. 8 illustrates such a method of solving Maxwell equation(s) numerically, using a finite element method to find each of three adjacent eigenfrequencies, $f_l$, $f_{l+1}$, and $f_{l-1}$ representing mode frequencies of the resonator structure, and using reduced memory.

Block 800 represents solving the Maxwell equation(s) [35-39] to compute one of the eigenfrequencies using the finite element method using a rough mesh.

Block 802 represents refining the rough mesh by increasing the number of mesh vertices within the rough mesh, to form a refined mesh.

Block 804 represents solving the Maxwell equation(s) [35-39] to compute the one of the eigenfrequencies using the finite element method using the refined mesh of Block 802.

Block 806 represents repeating steps 800-804 using the refined mesh obtained in step 802 as the rough mesh in the next computing step 800, thereby generating a plurality of refined meshes, until the one of the eigenfrequencies converges with sufficient precision.

Block 808 represents solving the Maxwell equation(s) [35-39] to compute the remaining two eigenfrequencies using the rough mesh of Block 800.

Block 810 represents solving the Maxwell equation(s) [35-39] to compute the remaining two eigenfrequencies using the same sequence of refined meshes obtained in steps 802, 806. Block 812 represents repeating steps 808-810 using the same number of repeating steps as in step 806 (such that the refined mesh from a previous iteration 810 is used as the rough mesh in the next iteration 808) while adjusting the refractive index only such that errors introduced by the meshes are the same for all three eigenfrequencies.

Block 814 (and Block 710 in FIG. 7) represent calculating the dispersion from the three eigenfrequencies using the formula for $D_2$ and $D_2 = f_{l+1} - 2f_l - f_{l-1}$, as discussed above.

FIG. 3, block 308 represents outputting the dispersion as a function of wavelength after the above computation is repeated for a desired number of different wavelengths. The results of the dispersion modeling can be used to design/select the geometry, structure, and shape of the boundary and substrate such that the resonator structure having the desired dispersion can be fabricated. For example, different shapes/geometries/dimensions of the resonator structure (including the boundary) can be modeled and once the finite element modeling has identified the geometry/structure/shape of the resonator structure (including boundary) having the desired dispersion as a function of wavelength, the resonator structure having that geometry/structure/shape can be fabricated.

Figure 9:
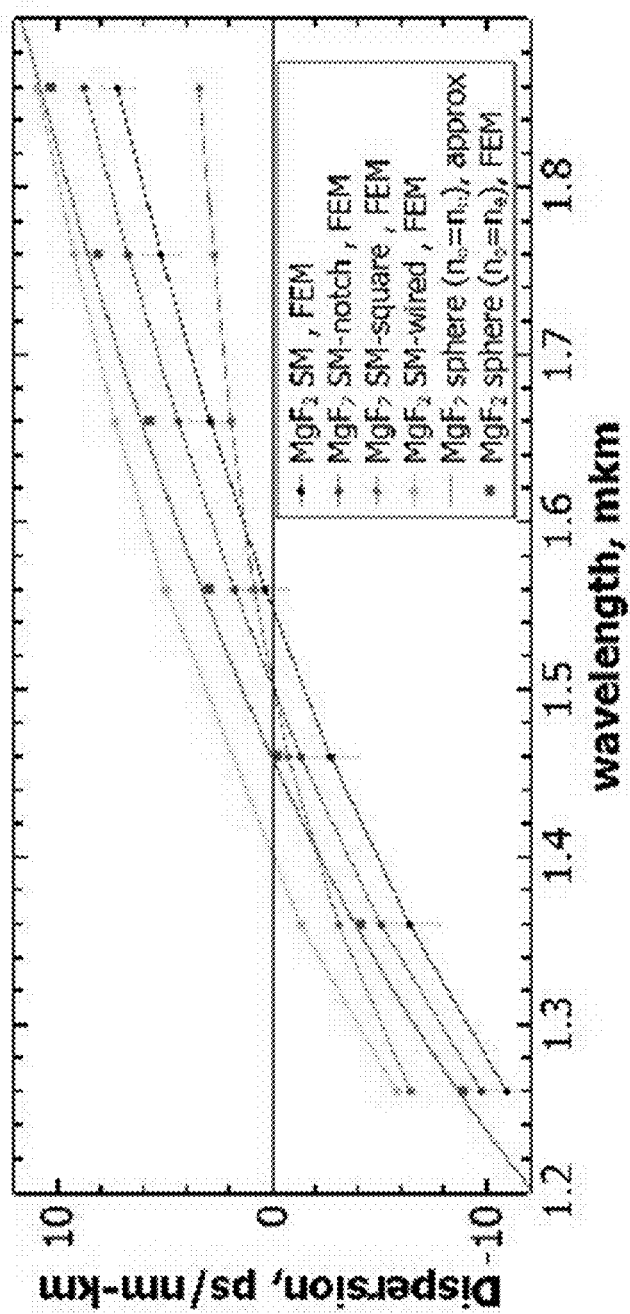
FIG. 9 illustrates dispersion as a function of wavelength for different micro-structured resonators and a non-micro-structured $MgF_2$ resonator, calculated using Finite Element Methods (FEM) according to one or more embodiments of the invention, including for a single mode (SM) $MgF_2$ resonator, a $MgF_2$ SM resonator with a notch on the boundary ($MgF_2$ SM-notch), an $MgF_2$ SM resonator having a protrusion on the boundary with a square profile ($MgF_2$ SM-square), an $MgF_2$ SM resonator having a protrusion with curved sidewalls as shaped by a wire cutter on the boundary ($MgF_2$ SM-wire), and an $MgF_2$ SM resonator comprising a sphere without boundary microstructuring ($MgF_2$ SM-sphere, FEM); dispersion for the $MgF_2$ SM-sphere calculated using an analytical method is also shown ($MgF_2$ SM-sphere, approx).

The modelling demonstrates the novel results of proper microstructuring at the boundary of the resonator: beneficial dispersion properties as a result of its geometry. This kind of micro-structured resonator is new in the field of WGM resonators and has not been demonstrated before. The prior art had no information on whether cavity microstructuring can affect WGM cavity dispersion. On the other hand, the modelling according to one or more embodiments of the invention (using sufficiently accurate/precise simulations) has confirmed the effects of microstructuring for the first time, as illustrated in FIG. 9 (showing dispersion curves for a number of resonator geometries). In FIG. 9, only one curve is prior art ((MgF$_2$ sphere ($n_o = n_e$), approx. the dispersion of a sphere obtained by analytical approximation).

Figure 10:
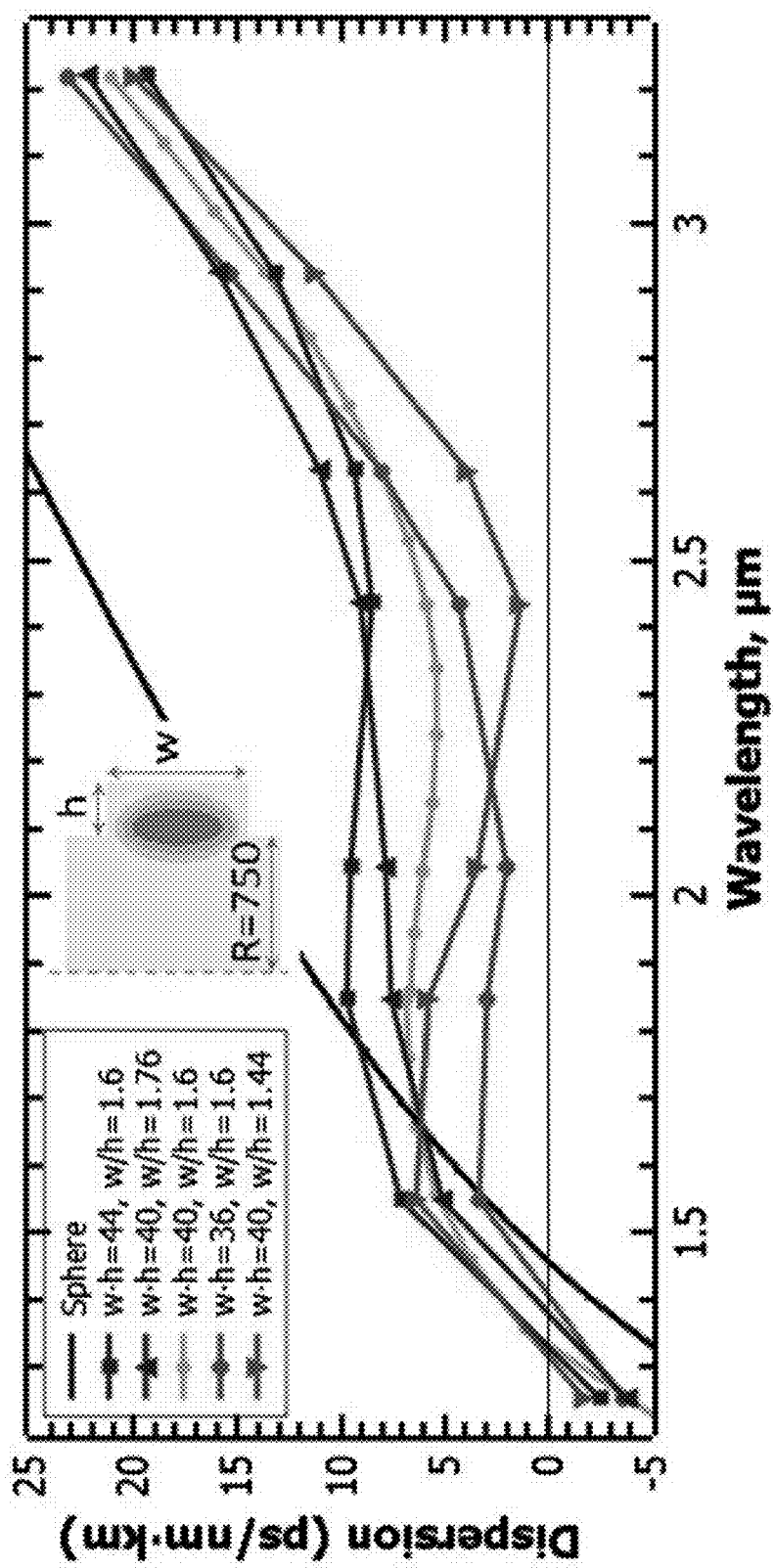
FIG. 10 illustrates dispersion as a function of wavelength, protrusion area, and aspect ratio for different micro-structured resonators, according to one or more embodiments of the invention. This set shows how the dispersion curve can be tuned in slope and absolute value.

By modeling a number of shapes of the MgF$_2$ resonator, it was found that a rectangular photonic belt with h=5 μm and w=7 μm has a flattened and reduced overall dispersion around the 1560 nm pump wavelength. It was also found that the wavelength dependence of GVD can be fine-tuned by changing the area and aspect ratio of the rectangular belt, as shown in FIG. 10.

Figure 11:
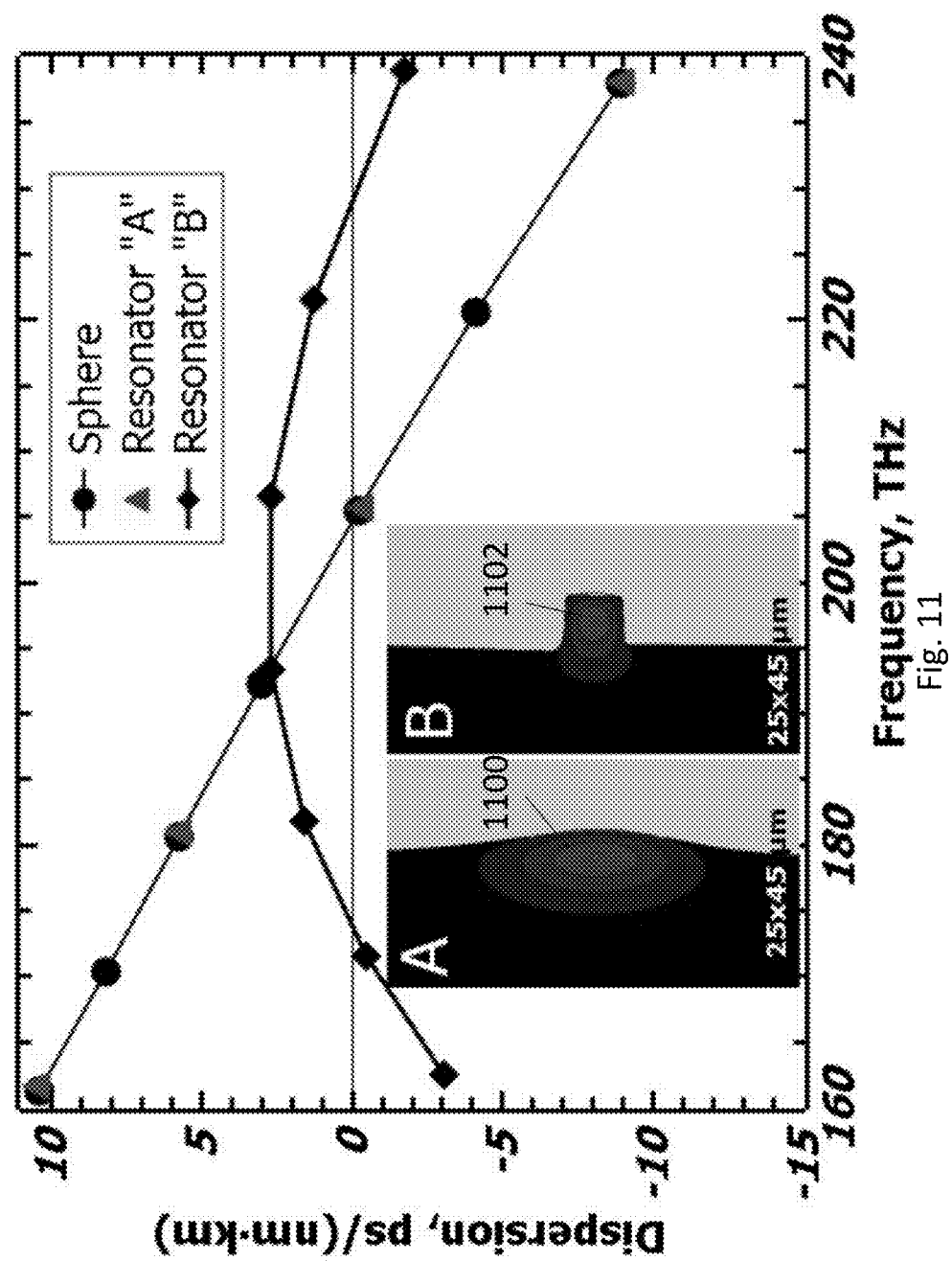
FIG. 11 illustrates a comparison of dispersion as a function of frequency for two different resonators, illustrating the dispersion engineering according to one or more embodiments of the invention.

FIG. 11 illustrates numerically computed total GVD for two MgF$_2$ resonators (A and B illustrated in FIG. 11). The resonator A, having a Gaussian profile similar to previously reported single-mode resonators [27], has the same dispersion as a spherical resonator. Mode profiles 1100, 1102 computed by FEM are also shown.

Figure 12:
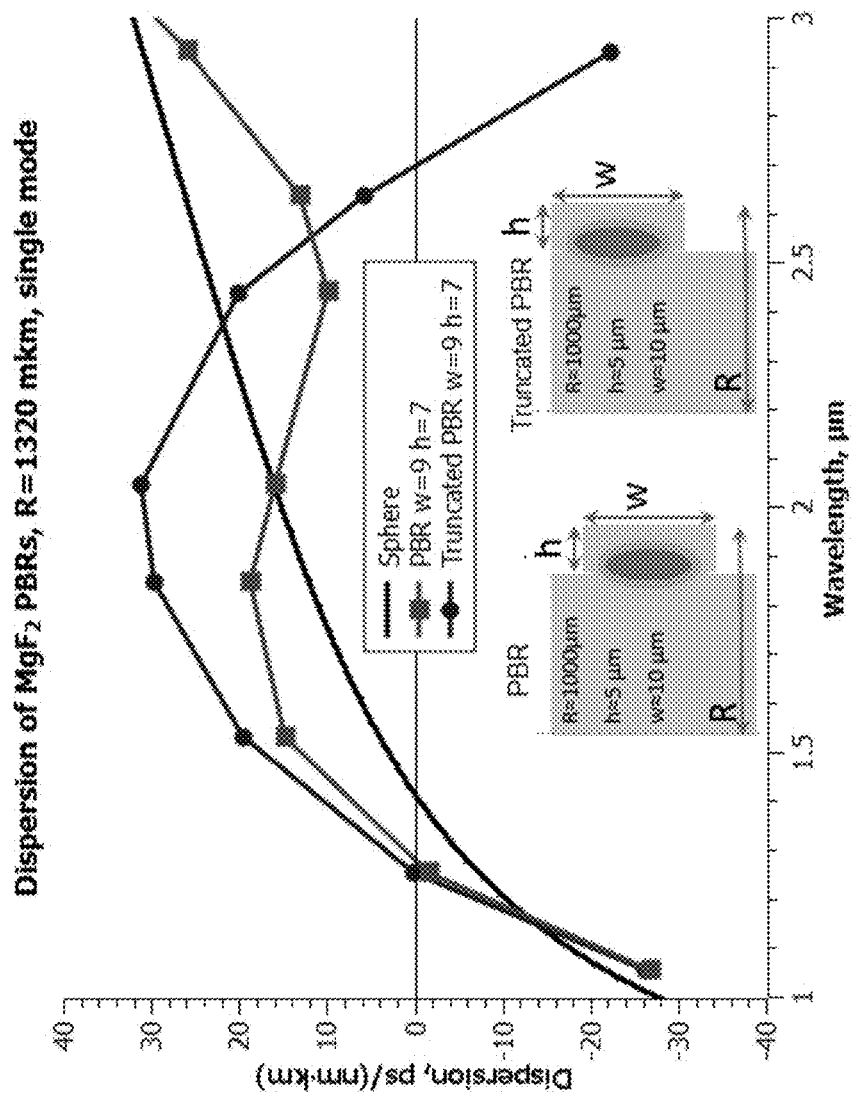
FIG. 12 illustrates dispersion as a function of wavelength for different positioning of the waveguide on a cylindrical substrate, according to one or more embodiments of the invention.

The photonic belt can be positioned in the middle, top, or bottom of the cylinder. FIG. 12 illustrates modelling of the situation where the photonic belt is not only in the middle of the cylinder but also at the top/bottom. In one or more embodiments where the photonic belt is at the top/bottom of the cylinder, the cylinder could be shrunk down to a thin layer, which in turn sits on a flat substrate/chip, so that the structure is "on a chip".

Frequency Comb Generator and Measurement

Figure 13:
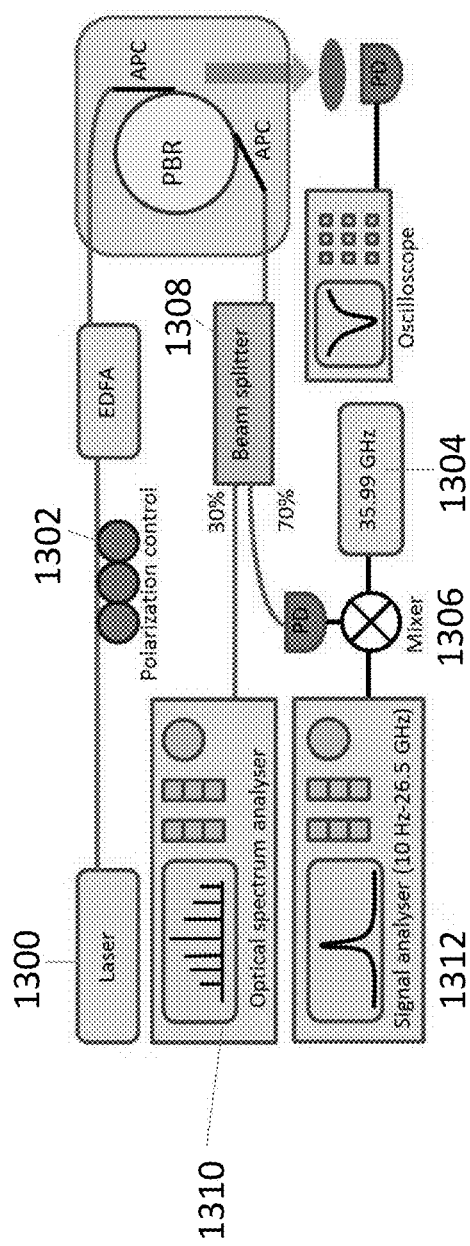
FIG. 13 illustrates an apparatus for generating a frequency comb according to one or more embodiments of the invention.

FIG. 13 illustrates an apparatus for generating and measuring a frequency comb, comprising a laser 1300 to excite the Transverse Electric (TE) mode of a PBR according to one or more embodiments of the invention. The apparatus further comprises polarization control 1302, an erbium doped fiber amplifier (EDFA), photodetector (PD), angle polished fiber couplers APC (to couple the light into and out of the PBR), a frequency generator 1304 generating 35.99 GHz, a mixer 1306, a beamsplitter 1308, a spectrum analyzer 1310, and a signal analyzer 1312.

Figure 14:
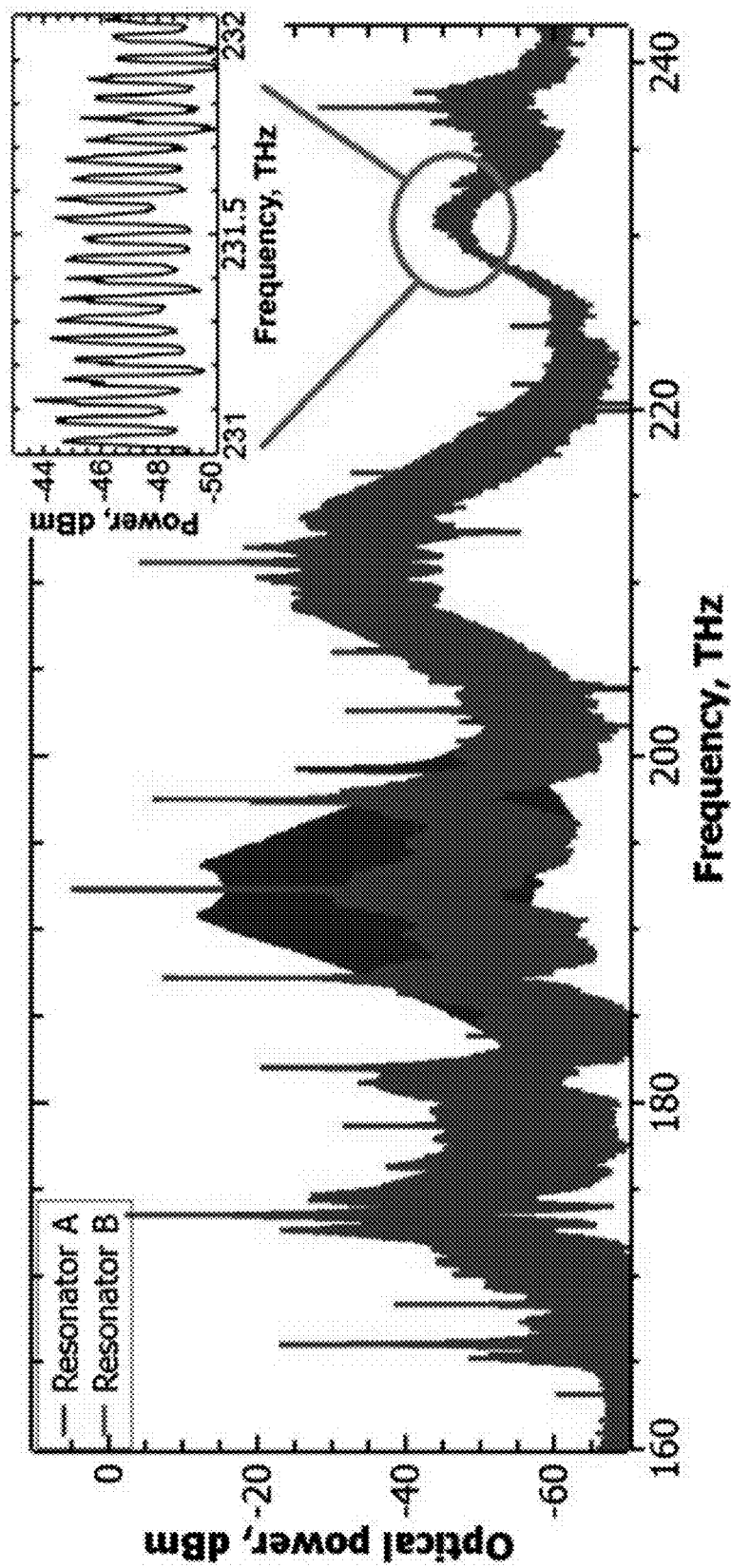
FIG. 14 illustrates the generation of a frequency comb using a microstructured resonator according to one or more embodiments of the invention.

FIG. 14 illustrates frequency combs generated with crystalline resonators and the effect of dispersion engineering. For the data shown in FIG. 14, the laser pump power is 300 mW at a wavelength λ=1560 nm (192.4 THz). Comb states from the Gaussian-shaped resonator (A) and the PBR (B, square like geometry) are shown at a minimum stable laser detuning. The comb from the PBR contains over 2000 lines and can span over one octave. The inset shows cavity FSR-spaced comb lines.

Figure 15:
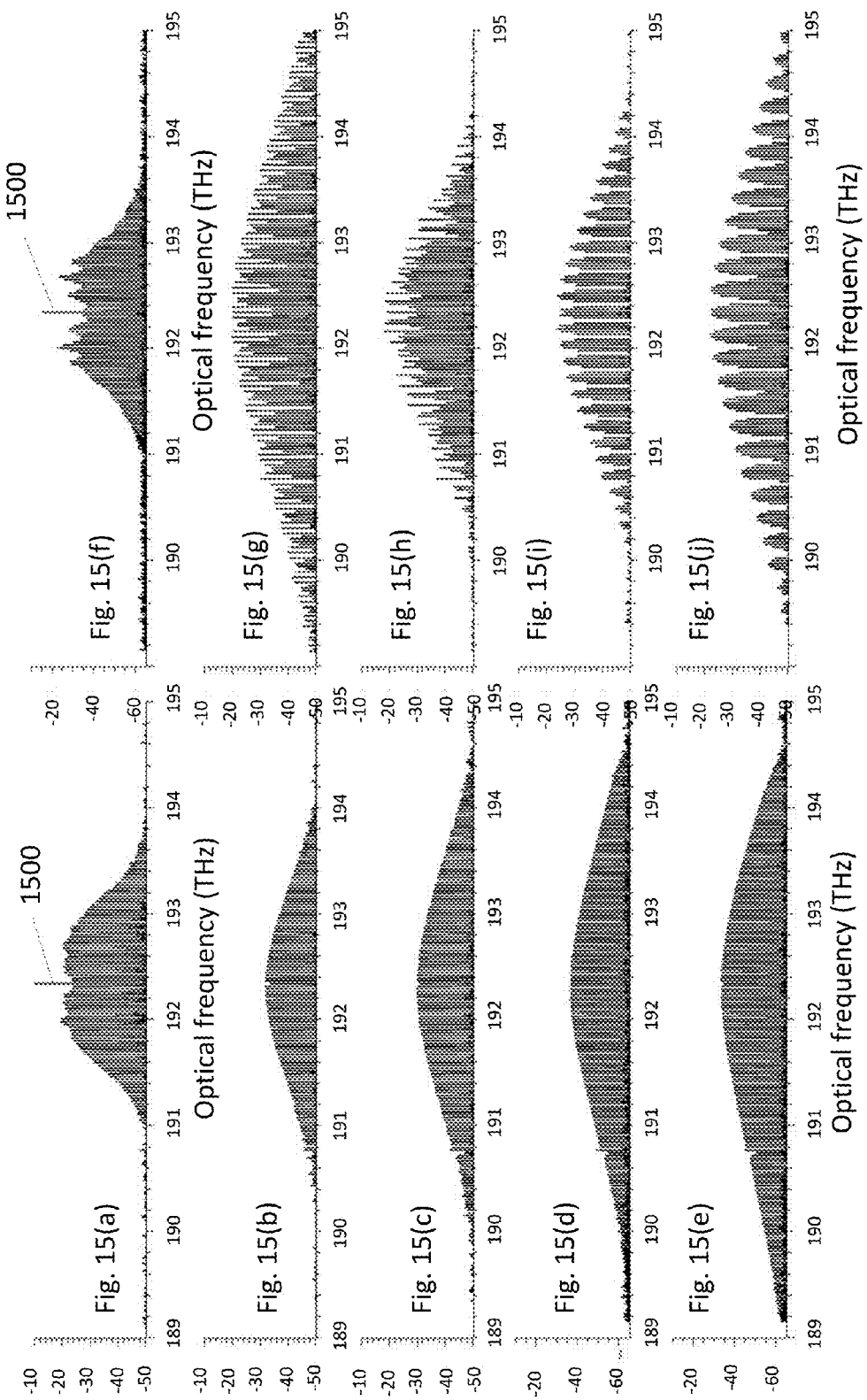
FIGS. 15(a)-(j) illustrate further the combs that can be generated with the resonators according to one or more embodiments of the invention.

FIGS. 15(*a*)-15(*j*) illustrates further the combs that can be generated with the resonators according to one or more embodiments of the invention. The comb generation process in microresonators in general supports many different comb states. These spectra were recorded by an optical spectrum analyzer monitoring light in the output fiber coupler of the setup similar to that shown in FIG. 13. The spectra include combs that have spectral profile typical of single soliton states (FIGS. 15(*b*)-15(*e*)) where, in addition to the state being single soliton, the intensity of the pump/carrier in the output fiber coupler is at the same level as the comb lines. FIG. 15(*a*) and FIG. 15(*f*) illustrate the pump (which is the central line 1500 in the comb envelopes of FIG. 15(*a*) and FIG. 15(*f*)) and the comb regimes can be achieved where this pump line is suppressed in the resulting comb (FIGS. 15(*b*)-15(*e*) and FIGS. 15(*g*)-15(*j*)). In other words, the carrier/pump is at the same level as the comb lines in these regimes. The spectra FIGS. 15(*g*)-15(*j*) illustrate comb states with multiple (not single) solitons present in the resonator.

Process Steps

Figure 16:
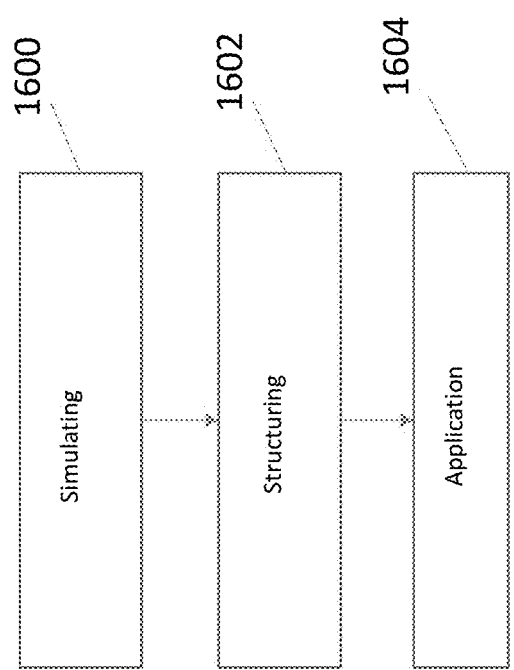
FIG. 16 illustrates a method of fabricating a microstructured resonator according to one or more embodiments of the invention.

FIG. 16 illustrates a method for fabricating a resonator structure according to one or more embodiments of the invention.

Block 1600 represents designing/simulating a structure for an axially symmetric boundary of a material (e.g., substrate, medium), wherein the structure defines a waveguide for electromagnetic radiation, and the structure has a geometry that engineers dispersion of the electromagnetic radiation.

One or more embodiments of the invention have used a verified and traceable finite element method (FEM) to compute the mode frequencies of various WGM resonators using sufficient resolution/precision (e.g., using the JPL supercomputer). The following behavior was identified: by changing the fine structure of the resonator in the area of mode localization, the total resonator group velocity dispersion (GVD, or dispersion) can be engineered. For example, the magnitude and slope of the second order GVD can be modified. The slope and higher order derivatives of second order GVD with respect to wavelength correspond to higher order GVD coefficients. In one or more embodiments, a square single mode resonator profile has the desired dispersion features significantly differing from the known dispersion of spherical or ellipsoidal idealized resonators. The dispersion of such a single mode resonator can be engineered by changing the geometry of the walls of the resonator in the mode localization area. A single mode resonator is defined here as one supporting one or more families of modes where one family of modes has sufficiently higher (e.g. by 50%) optical quality factors than the other family of modes for every possible polarization state (TE or TM or hybridized)

Block 1602 represents structuring the axially symmetric boundary/surface of the material with the structure, such that the structure defines a waveguide for electromagnetic radiation, and the structure has the geometry that engineers dispersion of the electromagnetic radiation.

Presently, a state of the art fabrication technique was used to fabricate the resonator. In one or more embodiments, mostly computer controlled diamond turning and microstructuring with some hand polishing was used.

Figure 17:
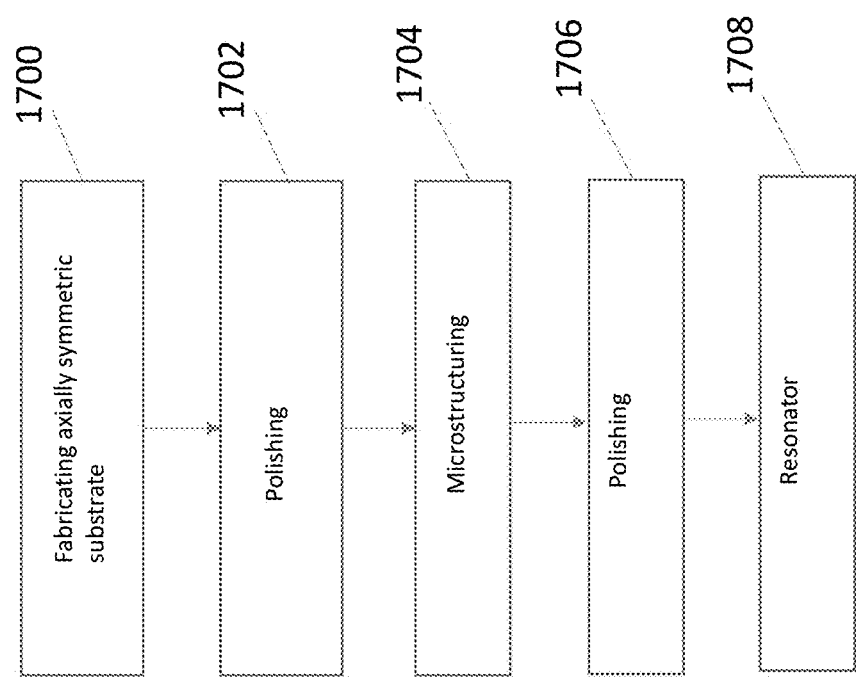
FIG. 17 illustrates a method of structuring the microstructured resonator according to one or more embodiments of the invention.

FIG. 17 illustrates a method of fabricating the resonator according to one or more embodiments. A cylinder is first fabricated using diamond turning (Block 1700, fabricating axially symmetric substrate). The cylinder is then polished with diamond abrasives (e.g., having grain size 3 micrometers and below), and then cleaned (Block 1702, polishing and/or cleaning). Using diamond turning, the radius of the cylinder is reduced by the height of the desired microstructure (Block 1704, microstructuring). This reduction takes place on both sides of the location of the microstructure, thus forming the waveguide and the adjacent areas on both sides. It is important to make such a waveguide wider than the final design waveguide by a 10-50 micrometer margin because diamond turning introduces subsurface damage. A custom polishing tool can then be used with diamond based polishing suspension to reduce the width of the waveguide and simultaneously bring the shape of its sidewalls to a vertical shape (Block 1706, polishing). The polishing step removes the area of subsurface damage introduced by diamond turning and helps achieve the desired width of the waveguide. This step also polishes the side walls of the waveguide. In one embodiment, the custom polishing tool can be based on a copper wire about 100 micrometer in diameter. The wire is cut in half along its length. Thus, the cross section of the cut wire is a semi-circle having two sharp edges. These sharp edges are used to cut and polish the side walls of the microstructure. Block 1708 represents the end result, a microstructured resonator.

The steps can be automated, and future fabrication techniques can be developed.

Block 1604 represents optionally incorporating the resonator structure in an application. In one or more embodiments, the motivation is the requirement that the frequency combs derived from optical microresonators reach an octave in span while being able to achieve soliton states and have measurable repetition rate below about 50 GHz. This is required for self-referencing a comb. The frequency comb span produced by conventional whispering gallery microcavities and other types of cavities is limited primarily by total cavity dispersion. To expand the comb towards an octave span, one or more embodiments of the present invention developed and used the new class of optical resonators described herein.

The method of Blocks 1600-1604 can be embodied in many ways, including the following:

1. The structured boundary can be on a surface of revolution about an axis of the material. For example, the material can have cylindrical or circular symmetry about an axis (e.g., the material can be a cone or a cylinder having a cylindrical boundary).
2. The structured boundary of embodiment 1 can be on a vertical or angled sidewall of the substrate.
3. The substrate of any of the embodiments 1-2 can have a diameter of more than 0.005 mm.
4. The structure of any of the embodiments 1-3 can comprise a photonic belt on a middle, top, and/or bottom of the boundary.
5. The material and structure of any of the embodiments 1-4 can be on a chip. There is a potential for on-chip heterogenous integration as the cavity can be made 10-100 micrometers thick.
6. The material of any of the embodiments 1-5 can be transparent to the electromagnetic radiation.
7. The structure of embodiments enables 1-6 changing the dispersion to something that is desirable by changing the geometry. In some embodiments small dispersion may be desired, others may need larger dispersion, and the needed slope of the dispersion wavelength dependence may be appropriately selected/changed. Thus, the waveguide's structure in any of the embodiments 1-6 can engineer the dispersion that is anomalous, normal, or nearly zero and also have a desired dependence on wavelength.
8. The waveguide structure in any of the embodiments 1-7 can flatten the wavelength dependence of the dispersion.
9. The waveguide structure of any of the embodiments 1-8 can support a single mode family, or more than one single mode family of the electromagnetic radiation.
10. The resonator of any of the embodiments 1-9 can enable a combination of 3 things for the first time: single mode operation, dispersion engineering, and optical Q above 1 billion.
11. The waveguide of any of the embodiments 1-10 can guide a whispering gallery mode of the electromagnetic radiation. In one or more of embodiments 1-10, the method of dispersion engineering/control can be used on resonators that others might call something different than "whispering gallery mode (WGM) resonators," for example, disk resonators or microdisk resonators, but that operate using a sufficiently similar principle.
12. The waveguide structuring of any of the embodiments 1-11 can comprise engineering a dimension, shape, and/or geometry of the waveguide. For example, the structure can comprise a microstructured ridge or microstructured protrusion on the boundary. The waveguide is not limited to a rectangular ridge waveguide —any microscopic structure (e.g., having dimensions in a 0.1-400 micrometer range) can be used and is essential as the shape of this microstructure defines the geometrical dispersion of the resonator along with the quality factors of its optical modes and the set of supported modes. The important feature is that the scale of a shape-microstructure is the same as the scale of the cross section of the optical mode field supported by the resonator. The microstructuring can comprise forming the structured boundary having dimensions (e.g., height and/or width) in a range of 1-100 micrometers or 1-10 micrometers, for example.

13. The resonator of any of the embodiments 1-12 can comprise a crystalline substrate and waveguide which can be made with different materials (e.g., comprising $LiNO_3$ or $MgF_2$).

14. The waveguide structuring of any of the embodiments 1-13 can use a computer-controlled process (inclu(ing, e.g., lithography) according to a pattern that is determined by numerically solving a three dimensional vectorial Maxwell equation.

15. The waveguide structuring of any of the embodiments 1-14 can use diamond turning in combination with polishing and optical contacting or adhesives to assemble arbitrary structures.

16. The waveguide structuring of any of the embodiments 1-15 can produce a waveguide geometry such that the resonator generates a comb of frequencies having a frequency span including at least one octave.

17. The geometry of any of the embodiments 1-16 can form the resonator generating a comb of repetition rate below 100 GHz.

Advantages and Improvements

The new cavity architecture according to one or more embodiments of the invention is distinct from all known and demonstrated optical resonators. It shares axial symmetry and mode confinement features with the regular and "single mode" whispering gallery mode (WGM) resonators. However, none of the demonstrated conventional WGM resonators had a micro structured shape that enables dispersion control in their cavities. It is possible that a previous patent [40] and publication [41] mention the rectangular resonator profile on a single mode resonator, but only in the context of enforcing a single mode condition. On the other hand, embodiments of the present invention have found that the shape and dimensions of the protrusion are critical in defining the cavity dispersion, which has not been emphasized before. The new cavity according to one or more embodiments of the invention resembles a conventional ring resonator but with the key difference that the substrate shares the axial symmetry of the ring. Finally, embodiments of the present invention differ from the wedged disk WGM resonators developed at Caltech [42] by the single mode operation possibility and by the presence of a substrate that shares the axial symmetry and acts as a modal sink (provides a route for energy leaking from the cavity, affecting cavity Q).

The new resonators according to one or more embodiments of the invention provide a combination of extremely small mode volume, high Q, and spectral and dispersion control which are immediately important for frequency comb technology and optical clocks necessary for space navigation and communications. More applications are likely to be found in quantum and nonlinear optical areas where dispersion control is required. For example, dispersion engineering will benefit a wider range of applications of WGM resonators, including optical frequency synthesizers, spectrometers and combs, Brillouin and Raman lasers, various lasers and sensors, single sideband generators, parametric and hyper-parametric oscillators, and other applications that depend on properties of cavity spectrum.

In addition, a new imaging technique, lithographic photography, was used to image the cross sections of the microstructures. Previously, similar cross sections were obtained by cutting a hole in a resonator using an ion milling and using an electron scanning microscope to obtain an image. The new technique, disclosed in one or more embodiments of the invention, is non-destructive.

Moreover, the methods of dispersion calculation by direct FEM modeling according to one or more embodiments of the invention are presently the most efficient available methods for modeling the dispersion of the microstructured resonators. By using the JPL supercomputer and developing our own FEM software, one or more embodiments of the present invention have for the first time modeled the mm-sized resonators. Moreover, one or more embodiments have surprisingly and unexpectedly found that the precision of the FEM method that can be achieved on a regular desktop computer can also be used to model dispersion for such larger, real life, mm sized resonators. The distinction between the small and large resonator comes from the fact that the frequency comb derived from resonators will have a repetition rate determined by cavity/resonator. diameter. Currently, repetition rates below 100 GHz are considered practically measurable, corresponding to a cavity having a diameter of above about 1 mm.

Hardware Environment

Figure 18:
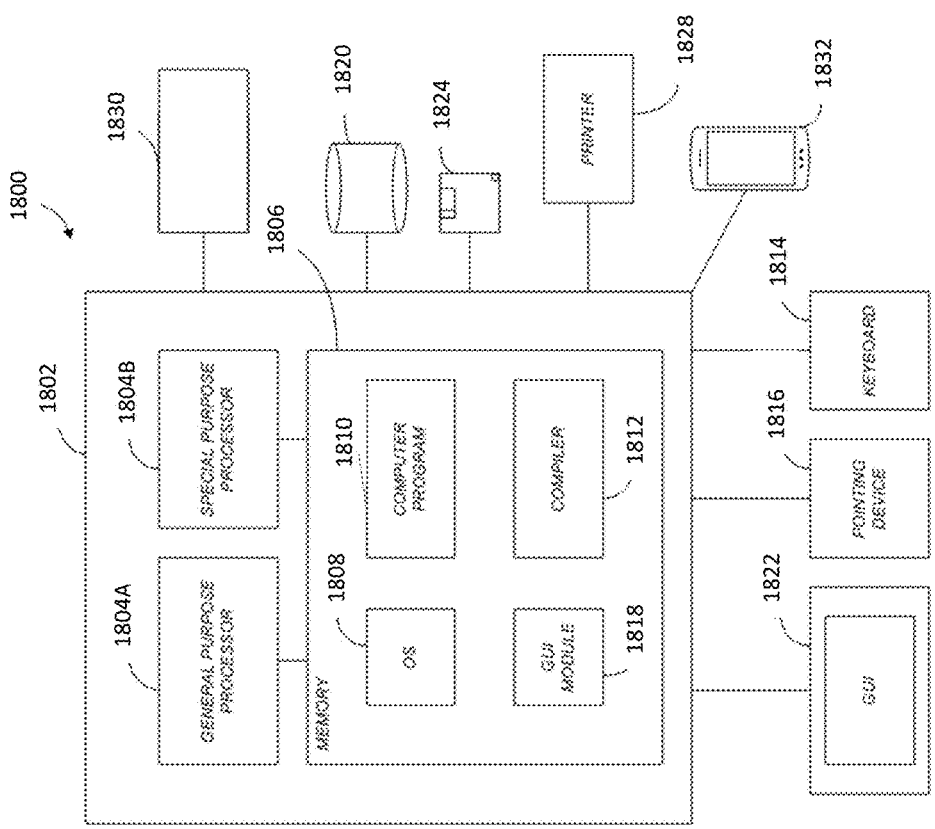
FIG. 18 is an exemplary hardware and software environment used to implement one or more embodiments of the invention.

FIG. 18 is an exemplary hardware and software environment 1800 used to implement one or more embodiments of the invention (specifically, the dispersion modelling illustrated in FIGS. 3, 7, 8 and related text). The hardware and software environment includes a computer 1802 and may include peripherals. Computer 1802 may be a user/client computer, server computer, or may be a database computer. The computer 1802 comprises a general purpose hardware processor 1804A and/or a special purpose hardware processor 1804B (hereinafter alternatively collectively referred to as processor 1804) and a memory 1806, such as random access memory (RAM). The computer 1802 may be coupled to, and/or integrated with, other devices, including input/output (I/O) devices such as a keyboard 1814, a cursor control device 1816 (e.g., a mouse, a pointing device, pen and tablet, touch screen, multi-touch device, etc.) and a printer 1828.

In one or more embodiments, computer 1802 may be coupled to, or may comprise, a personal computer, desktop device (e.g., HP Compaq™), portable device (e.g., laptop, mobile device), or multi-touch device.

In one embodiment, the computer 1802 operates by the general purpose processor 1804A performing instructions defined by the computer program 1810 under control of an operating system 1808. The computer program 1810 and/or the operating system 1808 may be stored in the memory 1806 and may interface with the user and/or other devices to accept input and commands and, based on such input and commands and the instructions defined by the computer program 1810 and operating system 1808, to provide output and results.

Output/results may be presented on the display 1822 or provided to another device for presentation or further processing or action. In one embodiment, the display 1822 comprises a liquid crystal display (LCD) having a plurality of separately addressable liquid crystals. Alternatively, the display 1822 may comprise a light emitting diode (LED) display having clusters of red, green and blue diodes driven together to form full-color pixels. Each liquid crystal or pixel of the display 1822 changes to an opaque or translucent state to form a part of the image on the display in response to the data or information generated by the processor 1804 from the application of the instructions of the computer program 1810 and/or operating system 1808 to the input and commands. The image may be provided through a graphical user interface (GUI) module 1818. Although the GUI module 1818 is depicted as a separate module, the instructions performing the GUI functions can be resident or distributed in the operating system 1808, the computer program 1810, or implemented with special purpose memory and processors.

In one or more embodiments, the display 1822 is integrated with/into the computer 1802 and comprises a multi-touch device having a touch sensing surface (e.g., track pod or touch screen) with the ability to recognize the presence of two or more points of contact with the surface. Examples of multi-touch devices include tablet computers (e.g., IPAD, HP TOUCHPAD).

Some or all of the operations performed by the computer 1802 according to the computer program 1810 instructions may be implemented in a special purpose processor 1804B. In this embodiment, the some or all of the computer program 1810 instructions may be implemented via firmware instructions stored in a read only memory (ROM), a programmable read only memory (PROM) or flash memory within the special purpose processor 1804B or in memory 1806. The special purpose processor 1804B may also be hardwired through circuit design to perform some or all of the operations to implement the present invention. Further, the special purpose processor 1804B may be a hybrid processor, which includes dedicated circuitry for performing a subset of functions, and other circuits for performing more general functions such as responding to computer program 1810 instructions. In one embodiment, the special purpose processor 1804B is an application specific integrated circuit (ASIC).

The computer 1802 may also implement a compiler 1812 that allows an application or computer program 1810 written in a programming language such as C, C++, Assembly, SQL, PYTHON, PROLOG, MATLAB, RUBY, RAILS, HASKELL, or other language to be translated into processor 1804 readable code. Alternatively, the compiler 1812 may be an interpreter that executes instructions/source code directly, translates source code into an intermediate representation that is executed, or that executes stored precompiled code. Such source code may be written in a variety of programming languages such as JAVA, JAVASCRIPT, PERL, BASIC, etc. After completion, the application or computer program 1810 accesses and manipulates data accepted from I/O devices and stored in the memory 1806 of the computer 1802 using the relationships and logic that were generated using the compiler 1812.

The computer 1802 also optionally comprises an external communication device such as a modem, satellite link, Ethernet card, or other device for accepting input from, and providing output to, other computers 1802.

In one embodiment, instructions implementing the operating system 1808, the computer program 1810, and the compiler 1812 are tangibly embodied in a non-transitory computer-readable medium, e.g., data storage device 1820, which could include one or more fixed or removable data storage devices, such as a zip drive, floppy disc drive 1824, hard drive, CD-ROM drive, tape drive, etc. Further, the operating system 1808 and the computer program 1810 are comprised of computer program 1810 instructions which, when accessed, read and executed by the computer 1802, cause the computer 1802 to perform the steps necessary to implement and/or use the present invention or to load the program of instructions into a memory 1806, thus creating a special purpose data structure causing the computer 1802 to operate as a specially programmed computer executing the method steps described herein. Computer program 1810 and/or operating instructions may also be tangibly embodied in memory 1806 and/or data communications devices 1830, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 1802.

Figure 19:
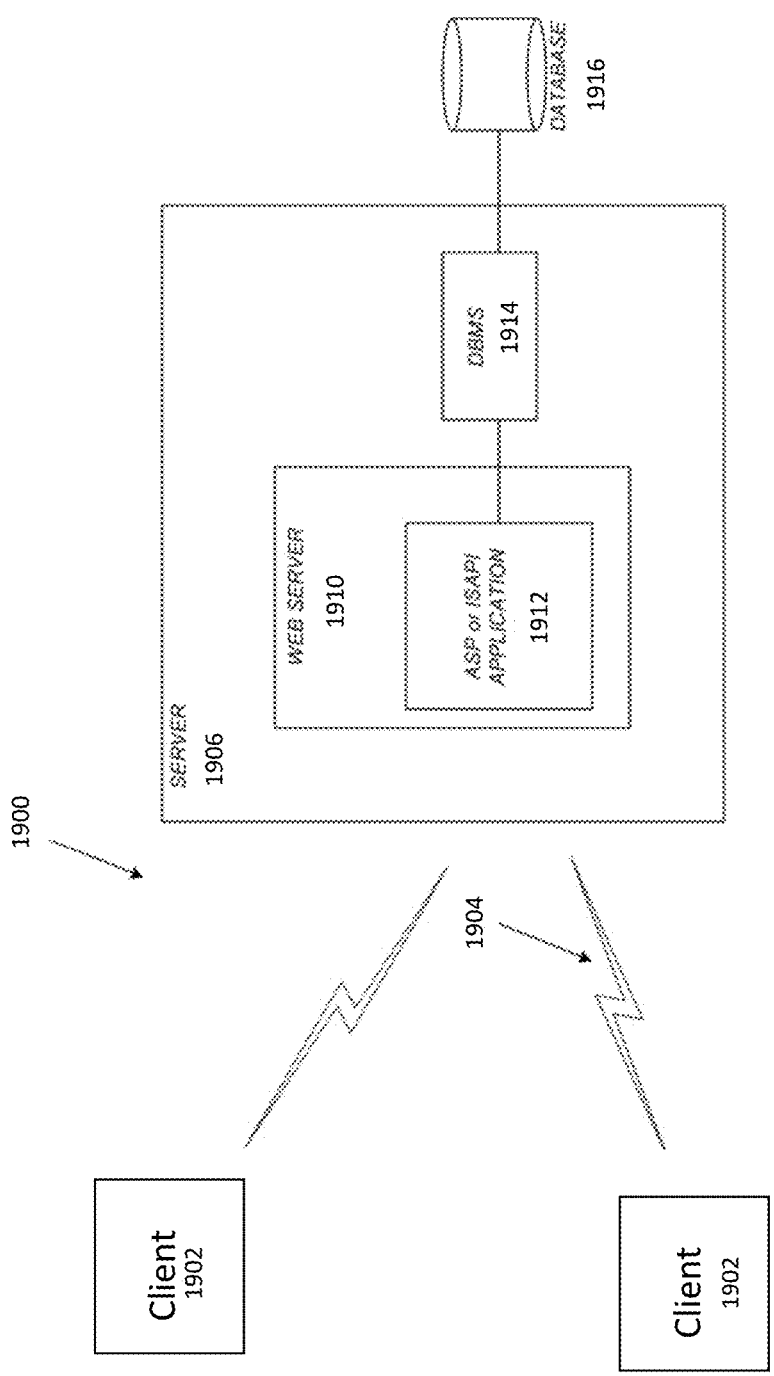
FIG. 19 schematically illustrates a typical distributed/cloud-based computer system using a network to connect client computers to server computers, according to one or more embodiments of the invention.

FIG. 19 schematically illustrates a typical distributed/cloud-based computer system 1900 using a network 1904 to connect client computers 1902 to server computers 1906. A typical combination of resources may include a network 1904 comprising the Internet, LANs (local area networks), WANs (wide area networks), SNA (systems network architecture) networks, or the like, clients 1902 that are personal computers or workstations (as set forth in FIG. 18), and servers 1906 that are personal computers, workstations, minicomputers, or mainframes (as set forth in FIG. 18). However, it may be noted that different networks such as a cellular network (e.g., GSM [global system for mobile communications] or otherwise), a satellite based network, or any other type of network may be used to connect clients 1902 and servers 1906 in accordance with embodiments of the invention.

A network 1904 such as the Internet connects clients 1902 to server computers 1906. Network 1904 may utilize ethernet, coaxial cable, wireless communications, radio frequency (RF), etc. to connect and provide the communication between clients 1902 and servers 1906. Further, in a cloud-based computing system, resources (e.g., storage, processors, applications, memory, infrastructure, etc.) in clients 1902 and server computers 1906 may be shared by clients 1902, server computers 1906, and users across one or more networks. Resources may be shared by multiple users and can be dynamically reallocated per demand. In this regard, cloud computing may be referred to as a model for enabling access to a shared pool of configurable computing resources.

Clients 1902 may execute a client application or web browser and communicate with server computers 1906 executing web servers 1910. Such a web browser is typically a program such as MICROSOFT INTERNET EXPLORER, MOZILLA FIREFOX, OPERA, APPLE SAFARI, GOOGLE CHROME, etc. Further, the software executing on clients 1902 may be downloaded from server computer 1906 to client computers 1902 and installed as a plug-in or ACTIVEX control of a web browser. Accordingly, clients 1902 may utilize ACTIVEX components/component object model (COM) or distributed COM (DCOM) components to provide a user interface on a display of client 1902. The web server 1910 is typically a program such as MICROSOFT'S INTERNET INFORMATION SERVER.

Web server 1910 may host an Active Server Page (ASP) or Internet Server Application Programming Interface (ISAPI) application 1912, which may be executing scripts. The scripts invoke objects that execute business logic (referred to as business objects). The business objects then manipulate data in database 1916 through a database management system (DBMS) 1914. Alternatively, database 1916 may be part of, or connected directly to, client 1902 instead of communicating/obtaining the information from database 1916 across network 1904. When a developer encapsulates the business functionality into objects, the system may be referred to as a component object model (COM) system. Accordingly, the scripts executing on web server 1910

(and/or application 1912) invoke COM objects that implement the business logic. Further, server 1906 may utilize MICROSOFT'S TRANSACTION SERVER (MTS) to access required data stored in database 1916 via an interface such as ADO (Active Data Objects), OLE DB (Object Linking and Embedding DataBase), or ODBC (Open DataBase Connectivity).

Generally, these components 1900-1916 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 1902 and 1906 may be interchangeable and may further include thin client devices with limited or full processing capabilities, portable devices such as cell phones, notebook computers, pocket computers, multi-touch devices, and/or any other devices with suitable processing, communication, and input/output capability.

In one or more embodiments, the "user computer," "client computer", and/or "server computer" may comprise a supercomputer or a computer having high-level computational capacity. In one or more embodiments, the "user computer," "client computer", and/or "server computer," individually or in combination, may comprise multiple processors to form a shared memory parallel computer and/or a computer system having at least 32 Gigabytes of RAM memory. In one or more embodiments, the "user computer," "client computer", and/or "server computer" may use a SUSE LINUX or another LINUX or UNIX operating system (however, any available operating system, further including but not limited to, Mac OS, Windows, OS/2, CentOS, can be used). The dispersion modeling results illustrated in FIGS. 10-12 were obtained using the method of FIG. 7 on the JPL supercomputer comprising multiple processors (to form a shared memory parallel computer), using a SUSE LINUX operating system and message interface coding.

Of course, those skilled in the art will recognize that any combination of the above components, or any number of different components, peripherals, and other devices, may be used with computers 1902 and 1906.

REFERENCES

The following references are incorporated by reference herein.

1. A. B. Matsko and V. S. Ilchenko, IEEE J. Sel. Top. Quantum Electron. 12, 3 (2006).
2. A. B. Matsko, Practical Applications of Microresonators in Optics and Photonics (CRC Press, 2009).
3. A. A. Savchenkov, A. B. Matsko, V. S. Ilchenko, and L. Maleki, Opt. Express 15, 6768 (2007).
4. R. W. Boyd, Nonlinear Optics (Academic, 2003).
5. M. Hossein-Zadeh and A. F. J. Levi, IET Optoelectron. 5, 36 (2011).
6. I. S. Grudinin, A. B. Matsko, and L. Maleki, Phys. Rev. Lett. 102, 043902 (2009).
7. J. U. Furst, D. V. Strekalov, D. Elser, A. Aiello, U. L. Andersen, C. Marquardt, and G. Leuchs, Phys. Rev. Lett. 106, 113901 (2011).
8. T. Herr, V. Brasch, J. D. Jost, C. Y. Wang, N. M. Kondratiev, M. L. Gorodetsky, and T. J. Kippenberg, Nat. Photonics 8, 145 (2013).
9. J. Hofer, A. Schliesser, and T. J. Kippenberg, Phys. Rev. A 82, 031804 (2010).
10. M. Foertsch, J. U. Fuerst, C. Wittmann, D. Strekalov, A. Aiello, M. V. Chekhova, C. Silberhorn, G. Leuchs, and C. Marquardt, Nat. Commun.4, 1818 (2013).
11. D. Strekalov, A. S. Kowligy, Y. P. Huang, and P. Kumar, New J. Phys. 16, 053025 (2014).
12. D. J. Moss, R. Morandotti, A. L. Gaeta, and M. Lipson, Nat. Photonics 7, 597 (2013).
13. P. Del'Haye, E. Gavartin, M. L. Gorodetsky, R. Holzwarth, and T. J. Kippenberg, Phys. Rev. Lett. 107, 063901 (2011).
14. J. Li, X. Yi, H. Lee, S. A. Diddams, and K. J. Vahala, Science 345, 309 (2014).
15. J. Riemensberger, K. Hartinger, T. Herr, V. Brasch, R. Holzwarth, and T. J. Kippenberg, Opt. Express 20, 27661 (2012).
16. V. S. Ilchenko, A. A. Savchenkov, A. B. Matsko, and L. Maleki, J. Opt. Soc. Am. A 20, 157 (2003).
17. A. A. Savchenkov, A. B. Matsko, W. Liang, V. S. Ilchenko, D. Seidel, and L. Maleki, Nat. Photonics 5, 293 (2011).
18. A. B. Matsko, V. S. Ilchenko, A. A. Savchenkov, and L. Maleki, J. Opt. Soc. Am. B 20, 2292 (2003).
19. C. M. B. Cordeiro, W. J. Wadsworth, T. A. Birks, and P. S. J. Russell, Opt. Lett. 30, 1980 (2005).
20. B. J. M. Hausmann, I. Bulu, V. Venkataraman, P. Deotare, and M. Loncar, Nat. Photonics 8, 369 (2014).
21. I. S. Grudinin, L. Baumgartel, and N. Yu, Opt. Express 21, 26929 (2013).
22. T. Herr, V. Brasch, J. D. Jost, I. Mirgorodskiy, G. Lihachev, M. L. Gorodetsky, and T. Kippenberg, Phys. Rev. Lett. 113, 123901 (2014).
23. Y. Liu, Y. Xuan, X. Xue, P.-H. Wang, S. Chen, A. J. Metcalf, J. Wang, D. E. Leaird, M. Qi, and A. M. Weiner, Optica 1, 137 (2014).
24. S.-W. Huang, H. Zhou, J. Yang, J. F. McMillan, A. Matsko, M. Yu, D.-L. Kwong, L. Maleki, and C. W. Wong, arXiv:1404.3256 (2015).
25. C. Godey, I. Balakireva, A. Coillet, and Y. K. Chembo, Phys. Rev. A 89, 063814 (2014).
26. A. A. Savchenkov, I. S. Grudinin, A. B. Matsko, D. Strekalov, M. Mohageg, V. S. Ilchenko, and L. Maleki, Opt. Lett. 31, 1313 (2006).
27. F. Ferdous, A. A. Demchenko, S. P. Vyatchanin, A. B. Matsko, and L. Maleki, Phys. Rev. A 90, 033826 (2014).
28. T. J. Kippenberg, R. Holzwarth, and S. A. Diddams, Science 332, 555 (2011).
29. A. A. Savchenkov, D. Eliyahu, W. Liang, V. S. Ilchenko, J. Byrd, A. B. Matsko, D. Seidel, and L. Maleki, Opt. Lett. 38, 2636 (2013).
30. S. B. Papp, K. Beha, P. DelHaye, F. Quinlan, H. Lee, K. J. Vahala, and S. A. Diddams, Optica 1, 10 (2014).
31. J. Pfeifle, V. Brasch, M. Lauermann, Y. Yu, D. Wegner, T. Herr, K. Hartinger, P. Schindler, J. Li, D. Hillerkuss, R. Schmogrow, C. Weimann, R. Holzwarth, W. Freude, J. Leuthold, T. J. Kippenberg, and C. Koos, Nat. Photonics 8, 375 (2014).
32. S. Coen and M. Erkintalo, Opt. Lett. 38, 1790 (2013).
33. M. R. E. Lamont, Y. Okawachi, and A. L. Gaeta, Opt. Lett 38, 3478 (2013).
34. J. P. Webb, IEEE Trans. Microwave Theory Tech. MTT-33, 635 (1985).

35. FreeFem+-cs website entitled "http://www.ann.jussieu.fr/~lehyaric/ffcs/" as downloaded on Mar. 14, 2016, containing source code developed by I. Grudinin used to compute eigenvalues.

36. M. Oxborrow, IEEE Trans. Microwave Theory Tech. Vol. 55, No. 6, p. 1209 (2007)

37. F. Hecht, J. Numer. Math. 20, 251 (2012).

38. I. Grudinin and Nan Yu, J. Opt. Soc. Am. B/Vol. 29, No. 11/November 2012 Finite-element modeling of coupled optical microdisk resonators for displacement sensing.

39. COMSOL, Matlab, and Mathematica sources code Website entitled "https://sites.google.com/site/axisymmetricmarkoxborrow/" as downloaded on Mar. 14, 2016.

40. U.S. Pat. No. 7,440,651 "Single mode whispering-gallery-mode resonator"

41. Anatoliy A. Savchenkov, Ivan S. Grudinin, Andrey B. Matsko, Dmitry Strekalov, Makan Mohageg, Vladimir S. Ilchenko, and Lute Maleki, Morphology-dependent photonic circuit elements, Optics Letters, Vol. 31, Issue 9, pp. 1313-1315 (2006) doi: 10.1364/OL.31.001313, see website entitled "https://www.osapublishing.org/ol/abstract.cfm?uri=ol-31-9-1313&origin=search"

42. Hansuek Lee*, Tong Chen*, Jiang Li*, Ki Youl Yang, Seokmin Jeon, Oskar Painter and Kerry J. Vahala, "Chemically etched ultrahigh-Q wedge-resonator on a silicon chip" Nature Photonics 6, 369-373 (2012).

43. Ivan S. Grudinin, Lukas Baumgartel, and Nan Yu, Frequency comb from a microresonator with engineered spectrum, as downloaded on Mar. 14, 2016 from the web site entitled " http://arxiv.org/ftp/arxiv/papers/1202/1202.1318.pdf."

44. Ivan S. Grudinin, Lukas Baumgartel, and Nan Yu, Frequency comb from a microresonator with engineered spectrum, Optics Express, Vol. 20, Issue 6, pp. 6604-6609 (2012), doi: 10.1364/OE.20.006604, see website entitled "https://www.osapublishing.org/oe/abstract.cfm?uri=oe-20-6-6604&origin=search."

45. I. S. Grudinin, and Nan Yu, Microstructured crystalline resonators for optical frequency comb generation, as downloaded on Mar. 14, 2016, from website entitled http://arxiv.org/abs/1406.2682.

46. Ivan Grudinin and Nan Yu, Dispersion Engineering of crystalline resonators via microstructuring, Optica, Vol. 2, No. 3/March. 2015, page 221.

CONCLUSION

This concludes the description of the preferred embodiment of the present invention. The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A resonator, comprising:
a protrusion formed on an axially symmetric boundary of a substrate, the protrusion:
guiding a mode of the electromagnetic radiation in the resonator,
having a rectangular cross-section having a height and a width and an aspect ratio A (the width divided by the height) wherein A≤2, and
wherein the aspect ratio is capable of significantly altering a shape of the dispersion curve of the electromagnetic radiation in the resonator, rather than merely shifting the dispersion curve, resulting in flattening of the wavelength dependence of dispersion of the electromagnetic radiation guided within the resonator.

2. The resonator of claim 1, wherein the protrusion comprises a photonic belt on the substrate.

3. The resonator of claim 1, wherein the boundary is on a surface of revolution about an axis of the resonator.

4. The resonator of claim 1, wherein the dimensions and the aspect ratio of the protrusion:
flatten the wavelength dependence of dispersion so that the dispersion is flat or nearly zero over a range of wavelengths of the electromagnetic radiation,
support a single mode family, or more than one single mode family of the electromagnetic radiation, and
obtain a controlled Q-factor for the resonator.

5. The resonator of claim 1, wherein:
the protrusion on the boundary comprises the height in a range of 0.1-100 micrometers, the width in a range of 0.1-100 micrometers that is smaller than a height of the resonator, and a shape that is distinct from a shape of the resonator,
the mode comprises a whispering gallery mode, and
the resonator comprises a whispering gallery mode resonator.

6. The resonator of claim 1, wherein the boundary is on a vertical or angled sidewall of the substrate.

7. The resonator of claim 1, wherein the resonator comprises a cylindrical surface and the protrusion comprises a photonic belt formed on a middle, top, and/or bottom of the cylindrical surface.

8. The resonator of claim 1, wherein the electromagnetic radiation has a wavelength in a range of 0.1-400 micrometers.

9. The resonator of claim 1, wherein the resonator has a diameter of more than 0.005 mm.

10. The resonator of claim 1, wherein the substrate comprises a cylindrical substrate on a chip.

11. The resonator of claim 1, wherein a shape and dimensions of the protrusion form the resonator generating a comb of frequencies having a frequency span including one octave.

12. The resonator of claim 1, wherein a shape and dimensions of the protrusion form the resonator generating a comb of repetition rate below 100 GHz.

13. The resonator of claim 1, wherein:
the protrusion is structured using a computer-controlled process according to a pattern that is determined by numerically solving a three dimensional vectorial Maxwell equation.

14. The resonator of claim 13, wherein the numerical solving calculates eigenvalues with a precision achieved using a finite element method having meshes containing up to 0.5 million elements.

15. The resonator of claim 1, wherein the protrusion includes a cascaded cross-section.

16. The resonator of claim 1, wherein the resonator comprises a whispering gallery mode resonator and the height and the width are in a range of 0.1-100 micrometers.

17. A method for fabricating a resonator structure, comprising:
forming a protrusion on an axially symmetric boundary of a substrate, the protrusion:
guiding a mode of electromagnetic radiation along the boundary, having a rectangular cross-section having a height and a width and an aspect ratio A (the width divided by the height) wherein A≤2, and wherein the aspect ratio significantly alters and flattens the wavelength dependence of dispersion of the electromagnetic radiation guided within the resonator.

18. The method of claim 17, further comprising:

calculating the dispersion by numerically solving a three dimensional vectorial Maxwell equation using a finite element method (FEM), wherein:

the FEM utilizes meshes, and the solving includes calculating eigenvalues with a precision achieved using one or more of the meshes containing up to 0.5 million elements.

19. The method of claim 18, wherein the dispersion is calculated for the geometry having dimensions measured using the method comprising:

making a cast of the resonator;

filling the cast with a glue having different refractive index from the cast to form a replica;

after hardening the glue, cutting and polishing the replica to reproduce the resonator's geometry;

using an optical microscope to obtain an image of the resonator's geometry; and measuring the dimensions using the image.

20. The method of claim 17, further comprising:

solving a Maxwell equation numerically and using a finite element method to find each of three adjacent eigenfrequencies representing mode frequencies of the resonator structure, including:

(a) solving the Maxwell equation to compute one of the eigenfrequencies using the finite element method using a rough mesh, (b) refining the rough mesh by increasing the number of mesh vertices within the rough mesh, to form a refined mesh, (c) solving the Maxwell equation to compute the one of the eigenfrequencies using the finite element method using the refined mesh, (d) repeating steps (a)-(c) using the refined mesh obtained in step (b) as the rough mesh in the next computing step (a), thereby generating a plurality of refined meshes, until the one of the eigenfrequencies converges with sufficient precision, (e) solving the Maxwell equation to compute the remaining two eigenfrequencies using the rough mesh, (f) solving the Maxwell equation to compute the remaining two eigenfrequencies using the refined meshes obtained in steps (b),(d) and using the same number of repeating steps as in step (d), while adjusting the refractive index only such that errors introduced by the meshes are the same for all three eigenfrequencies; and calculating the dispersion from the three eigenfrequencies.

21. The method of claim 17, further comprising:

solving a Maxwell equation numerically and using a finite element method to find each of three adjacent eigenfrequencies $f_l$, $f_{l+1}$, and $f_{l-1}$ representing mode frequencies of the resonator structure, including:

(a) for each eigenfrequency, building a rough finite element mesh using a set of input approximations, (b) solving the Maxwell equation to compute each of the three eigenfrequencies using the rough finite element mesh, (c) refining each of the rough finite element meshes by increasing the number of mesh vertices within the rough finite element meshes, to form a refined mesh for each of the eigenfrequencies, (d) solving the Maxwell equation to compute the eigenfrequencies using the finite element method using the refined meshes, (e) repeating steps (b)-(d) using the refined meshes obtained in step (c) as the finite element rough mesh in the next solving step (a), until the eigenfrequencies converge with sufficient precision; and calculating the dispersion from the three eigenfrequencies using $$D = \frac{cD_2}{2\pi\lambda^2 RF^3} \times 10^6 \left[\frac{\text{ps}}{\text{nm}\cdot\text{km}}\right]$$

where $F=0.5\ (f_{l+1} - f_{l-1})$ is free spectral range near the wavelength $\lambda$, $D_2 = f_{l+1} - 2f_l - f_{l-1}$, $f_l$ is the optical mode frequency corresponding to l field nodes along the light-guiding boundary of the resonator, and l is an integer.

* * * * *